(12) United States Patent
Adam

(10) Patent No.: US 10,315,758 B2
(45) Date of Patent: Jun. 11, 2019

(54) OMNI-DIRECTIONAL THRUST VECTORING PROPULSOR

(71) Applicant: Martin Leon Adam, Brisbane (AU)

(72) Inventor: Martin Leon Adam, Brisbane (AU)

( * ) Notice: Subject to any disclaimer, the term of this patent is extended or adjusted under 35 U.S.C. 154(b) by 580 days.

(21) Appl. No.: 15/043,510

(22) PCT Filed: Aug. 19, 2014

(86) PCT No.: PCT/AU2014/000808
§ 371 (c)(1),
(2) Date: Feb. 13, 2016

(87) PCT Pub. No.: WO2015/024044
PCT Pub. Date: Feb. 26, 2015

(65) Prior Publication Data
US 2016/0221675 A1 Aug. 4, 2016

(30) Foreign Application Priority Data
Aug. 23, 2013 (AU) .................. 2013903211

(51) Int. Cl.
B64C 27/82 (2006.01)
B64C 27/52 (2006.01)
B64C 27/605 (2006.01)

(52) U.S. Cl.
CPC ............ B64C 27/82 (2013.01); B64C 27/52 (2013.01); B64C 27/605 (2013.01); B64C 2027/8218 (2013.01); B64C 2027/8227 (2013.01); B64C 2027/8236 (2013.01)

(58) Field of Classification Search
CPC ......... B64C 27/43; B64C 27/52; B64C 27/82; B64C 2027/8218; B64C 2027/8227; B64C 2027/8236
See application file for complete search history.

(56) References Cited

U.S. PATENT DOCUMENTS 5,597,138 A * 1/1997 Arlton .................. B64C 27/82
244/17.13
2013/0149151 A1* 6/2013 Rauber .................. B64C 27/43
416/141

* cited by examiner

Primary Examiner — Nicholas McFall

(57) ABSTRACT

A propulsion system comprising independent rotor subsystems producing a thrust force of a desired magnitude in any desired radial direction from the center of the propulsion system, driven from a single driveshaft that may be fixed in its position in the vehicle. When the propulsion system is fitted, for example, to a single-main-rotor helicopter in place of the convention anti-torque tail rotor, the helicopter is thereby equipped with a propulsion system that can produce yaw, pitch, the anti-torque lateral thrust for stability in hover, aft thrust or drag as well as the direct forward thrust that will enable the helicopter to fly at higher speeds. The propulsion system may also be applied in other aeronautical systems as well as to marine and industrial systems to impart energy into a fluid and thereby induce movement in that fluid.

10 Claims, 37 Drawing Sheets

PRIOR ART

OMNI-DIRECTIONAL THRUST VECTORING PROPULSOR

TECHNICAL FIELD

The present invention will be explained (at least predominantly) in the context of helicopters and other similar types of aircraft/rotorcraft. Indeed, it is thought that embodiments of the invention may prove particularly advantageous for single-main-rotor type helicopters. However, no limitation whatsoever as to the scope or application of the invention is to be inferred from this, and the invention could potentially also be used in a wide range of other applications or industries. For instance, the invention might find use in other aeronautical applications such as, for example, in rotorcraft with other main rotor configurations, or in fixed-wing propeller driven aeroplanes, or stop-rotor type aircraft, or airships, etc. The invention might also find use in marine applications such as, for example, in ships, boats, submarines, etc. The invention may even find use in non-vehicle related industrial applications such as, for example, in stationary fans used to propel or drive fluid flow, etc.

BACKGROUND

Conventional helicopters have reached a performance plateau, at least in terms of forward flight speed capability. Of course, even with such performance limitations, helicopters remain extremely useful flying machines in a wide range of military and civilian applications. However, helicopters (as well as other like rotorcraft) could potentially be even more useful if they could travel faster. The potential advantages in both military and civilian applications of a helicopter (or other similar rotorcraft) which is capable of higher speed forward flight will be readily apparent to those skilled in the art.

A number of developments and investigations in this area have been carried out in previous decades, and some continue today. Some examples of previous efforts to produce helicopters that are capable of higher speed forward flight are discussed briefly below. Note that the previous examples discussed below are mainly compound helicopters (almost gyrocopters). A compound helicopter being considered to be a helicopter that has at least one separate rotor (separate from the main rotor) for producing forward thrust.

As alluded to above, the potential usefulness of an aircraft which is capable of vertical take-off and landing, hover, and reasonably high-speed forward flight is apparent from the numerous previous efforts that have been made in pursuit of this goal. Recent investigations by major OEMs, and the push by various militaries for an increase in forward flight speed capability for helicopters and other rotorcraft, also suggests that there is a need for advancement in this area. However, the ability to provide an aircraft which is capable of vertical take-off and landing, hover, and forward flight at speeds higher than are currently possible should preferably also be achieved at a reasonable cost. That is, at a reasonable cost in terms of the financial/economic costs, and also in terms of costs or detriments in relation to other aspects of aircraft performance.

Two relatively recent attempts at producing an aircraft capable of vertical take-off and landing, hover, and higher-speed forward flight have been made by Sikorsky and Airbus Helicopters, respectively.

Whilst the configurations of the Sikorsky X2 and the Airbus Helicopters X3 differ considerably from each other in many respects, both are able to provide not only forward thrust for increased forward flight speed, but also the anti-torque forces necessary to balance the rotorcraft in hover and low speed flight. However, both configurations involve a new overall rotorcraft design. There is therefore little or no possibility for retrofit or conversion to adapt existing helicopters to these configurations and the likelihood is that the resulting production aircraft will be high in cost.

In a conventional single-main-rotor helicopter as schematically illustrated in FIG. 1, the main rotor provides lift and forward thrust as well as pitch and roll control. Therefore, for a conventional single-main-rotor helicopter to travel forward at speed, the main rotor must be tilted forward to provide a horizontal thrust component. The horizontal component of the total force produced by the main rotor must match the drag of the whole rotorcraft in order to maintain a constant speed. Also at high speed, the drag from air resistance on the aircraft is high. At high speed and high drag, the amount of lift and forward thrust that can be produced by the main rotor disk becomes limited because of the compounding effects of main rotor disk tilt and retreating blade of stall. In fact, retreating blade stall is one of the main factors that limits further increases in forward speed capability for conventional single-main-rotor helicopters.

Providing a separate rotor that directly generates forward thrust (e.g. like in the examples of the Sikorsky X2 and the Airbus X3) relieves the main rotor of the requirement to generate forward thrust. The main rotor is therefore only required to generate lift (although it must still also provide pitch and roll control forces). In any case, where one or more separate rotors are provided for providing forward thrust (meaning that the main rotor is not required to generate forward thrust) the main rotor disk therefore does not need to be tilted. In other words, because the main rotor disk does not need to be tilted, the angle of attack of the retreating blade does not need to be increased quite as much in order to balance the lift forces produced by the respective retreating-blade-side and advancing-blade-side of the disk. Accordingly, retreating blade stall is delayed and the result is that the maximum forward velocity achievable by the single-main-rotor helicopter can be increased.

Experimental compound helicopters have in the past achieved considerably higher speeds than conventional rotorcraft, with top speeds in the order of 400-500 km/hr. This suggests that compound helicopters may be able to provide a speed advantage of around 30-50% or more over conventional helicopters. Compound helicopters have also been found to benefit from improved specific fuel consumption resulting in an increase in range compared with conventional helicopters.

In view of the foregoing, in the context of helicopters, it would appear to be desirable if a propulsion system for a helicopter could be provided which is capable of producing the lateral anti-torque forces required to stabilise and manoeuvre a helicopter in hover, and which is also capable of producing, when required, a direct forward thrust force for forward flight so as to help achieve higher forward flight speed, and preferably with greater efficiency, than is currently possible. In order to reduce costs and possibly also allow for retrofit or conversion of current helicopters, it may also be preferable to avoid an entirely new overall aircraft design, and to instead provide a comparatively simpler tail-rotor system.

It is to be clearly understood that mere reference herein to previous or existing apparatus, systems, methods, practices, publications or other information, or to any problems or issues, does not constitute an acknowledgement or admission that any of those things individually or in any combination formed part of the common general knowledge of those skilled in the field, or that they are admissible prior art.

SUMMARY OF THE INVENTION

In one broad form, the present invention relates to an apparatus or propulsion system comprising
a first rotor for generating a first force, wherein the first rotor is rotatable about a first centre of rotation
a second rotor for generating a second force, wherein the second rotor is rotatable about a second centre of rotation
wherein the first rotor and the second rotor are controllably pivotable to become oriented at a desired angle relative to a plane which is perpendicular to an axis connecting the first and second centres of rotation, and the first rotor and the second rotor are pivotable independently of one another such that, at a given time, the first rotor can adopt a first angle to the said plane while the second rotor adopts a second angle to the said plane, wherein the first angle and the second angle are zero or non-zero and the same or different.

In another possible form, the present invention relates to an apparatus or propulsion system comprising
a drive member which is operable to rotate about a primary rotational axis,
a first rotor which is mounted to the drive member and rotates with the drive member to generate a first force, and
a second rotor which is mounted to the drive member and rotates with the drive member to generate a second force,
wherein the first rotor and the second rotor are pivotally mounted to the drive member such that each can be controllably pivoted to a desired angle relative to a plane which is perpendicular to the primary rotational axis, and the first rotor and the second rotor are pivotable independently of one another such that, at a given time, the first rotor adopts a first angle to the said plane and the second rotor adopts a second angle to the said plane, wherein the first angle and second angle are zero or non-zero and the same or different and where the first force and second force are zero or non-zero and the same or different.

Forms and embodiments of the invention in which the propulsion system has two rotors (i.e. the first rotor and the second rotor) will be described in more detail hereafter. However, it is to be clearly understood that the invention is not necessarily limited to only two rotors. Therefore, other embodiments and forms of the invention could be provided which have three or more rotors. Furthermore, from the explanations and discussions below, those skilled in the art will be able to extrapolate and understand how the invention might be implemented and provide benefits using three or more rotors. Like in the two-rotor embodiments discussed below, in embodiments of the invention having three or more rotors, each rotor may be an independent rotor (i.e. independent of the others).

The propulsion system in accordance with embodiments of the invention may be operable to produce a total force of controllably variable magnitude which can be controllably oriented at any angle of elevation relative to a plane that is perpendicular to the primary rotational axis and located at the centre of the propulsion system, and at any angle of azimuth about the primary rotational axis. The total force produced by the rotor system may be the vector sum of the first force and the second force.

Each rotor in the propulsion system may include at least one blade, and a pitch angle of each blade of each rotor may be variable. The pitch angle(s) of the one or more blades on one rotor may be variable independently of the pitch angle(s) of the one or more blades on the other rotor. In some embodiments, each rotor may include a plurality of blades, and for each rotor the pitch angle of each blade may be variable independently of the pitch angle(s) of the other blade(s) of that rotor. Accordingly, the pitch angles of the blades of the rotors may be variable collectively and cyclically.

The first and second rotors, whilst independently pivotable relative to the drive member, may nevertheless rotate together at the same speed as the drive member.

The drive member may comprise a driveshaft, and the primary rotational axis may then be the longitudinal axis of the driveshaft. Further, the driveshaft may be the driveshaft of a vehicle and may be mounted such that the longitudinal axis of the driveshaft is substantially parallel to a forward direction of travel of the vehicle. Of course, the driveshaft may alternatively be a driveshaft in some other non-vehicle machine or apparatus.

Where the drive member is the driveshaft of a vehicle, the propulsion system may be operable such that the total force produced by the rotor system can be controllably oriented at any angle of elevation from 0° to 90° from the longitudinal axis of the driveshaft, with any component of the total force that is parallel to the longitudinal axis being in either the vehicle's forward or aft direction, and such that the total force produced by the rotor system can be controllably oriented at any angle of azimuth about the longitudinal axis.

In some instances, the vehicle may be a helicopter with at least one main rotor for producing lift, and the propulsion system according to embodiments of the invention may be operable to produce horizontal (lateral and/or longitudinal) and/or vertical thrust force components to control the helicopter in hover and other modes of flight. The driveshaft may be mounted in, on or to a tail portion of the helicopter, and the first and second rotors may be mounted on or to a portion of the driveshaft which extends rearward from the tail portion.

The first rotor and second rotor may be mounted at axially spaced locations along the driveshaft. The first rotor and second rotor may be mounted such that the respective blades thereof are positioned at evenly spaced angles of azimuth about the driveshaft. Alternatively, the first rotor and second rotor may be mounted such that the respective blades thereof are not all positioned at evenly spaced angles of azimuth about the driveshaft. (Note that these possible alternative configurations may apply, not only for embodiments where the propulsion system forms part of a vehicle/helicopter, but also for other non-vehicle/non-helicopter related embodiments.) In any case the arrangement of the blades will be such so as to allow the safe intermeshing of the blades of Rotor 1 and Rotor 2 allowing embodiment of each rotor in close proximity to the other.

Referring again to embodiments where the propulsion system forms part of a vehicle/helicopter, in these embodiments rotation of the first rotor may create or define a first swept disk, rotation of the second rotor may create or define a second swept disk, and the respective disks may each be controllably tilted relative to a plane perpendicular to the axis of the driveshaft by an angle such that, together, the first and second rotors produce horizontal and/or vertical thrust force components to control the vehicle. In some preferred embodiments, each disk may be operable to tilt at least 30 degrees in any direction relative to the said plane perpendicular to the axis of the driveshaft.

Embodiments of the invention may further comprise a swashplate associated with each rotor. Each swashplate may be independent of the other(s). Also, each swashplate may be coaxial with the driveshaft and able to controllably move axially in each direction parallel to the axis of the driveshaft and pivot so as to become oriented at an angle (in any direction) relative to a plane perpendicular to the driveshaft.

In these embodiments, axial movement of a swashplate may cause collective change in pitch angle of the one or more blades of the rotor associated with that swashplate. Pivoting of a swashplate may cause cycling change in pitch angle of the one or more blades of the rotor associated with that swashplate.

Each swashplate may be actuated by actuators of a common form. The actuators may be controlled by one or a combination of electrical, mechanical and hydraulic connections to a user-operable control system, or by a user-operable active and/or digital control system (such as, for example, a fly by wire control system).

Each independent swashplate may be connected to the relevant rotor by a linkage comprising one or more linkage components. Each linkage may include a pitch change lever arm connected to the root of each blade of the relevant rotor, and also rod or a system of rods connecting each lever arm to the relevant swashplate.

The swashplates associated with the first and second rotors may be coaxial with the driveshaft. Also, the swashplates associated with the first and second rotors may be located at different axial locations relative to the driveshaft.

Each independent swash plate system is in turn controlled by a user-operable active control system the function of which is to coordinate the magnitude and direction of the thrust forces generated by each rotor to achieve the desire sum force vector. The user-operable active control system also maintains the safety of the system by ensuring pivot limits of rotor hubs are not reached and that the 'sense' of the control inputs does not result in the need for reversal by the operator.

Each hub of each independent rotor consists of a universal joint. These may be simple teetering hubs, single ring gimbals or multiple-ring gimbals.

Suitably, blades on one or both rotors may be straight or swept blades with symmetric or asymmetric aerofoil sections, with or without twist (washout) or any appropriate combination of blade parameters.

Any of the features described herein can be combined in any combination with any one or more of the other features described herein within the scope of the invention.

DESCRIPTION OF THE FIGURES

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of Figures as follows:

FIG. 12 represents various prior art. However, when the control system (not shown) comprises an independent swashplate for each rotor and each swashplate incorporates both collective and cyclic control functions this would be the first model of the Omni-Directional Thrust-Vectoring Propulsor.

FIG. 18 represents prior art. However, when the control system (not shown) comprises an independent swashplate for each rotor and each swashplate incorporates both collective and cyclic control functions this would be the second model of the Omni-Directional Thrust-Vectoring Propulsor. The angle offset between the two rotors in the second model, and the distance along the driveshaft separating the two rotors, should preferably set so as to achieve an overall minimum amount of wake interference optimised for the most important modes of flight/operation.

FIG. 21 shows a control system made up of two swashplates moved by separate and independent actuators. The swashplates are arranged on adjacent bulkheads with the aft rotor being controlled by the most-forward swashplate via push-pull rods running up the inside of the driveshaft. The same (or a similar) control system may also be applicable to the other models of Omni-Directional Thrust-Vectoring Propulsor.

FIG. 26 shows the three concentric spherical rings (36)(37)(38) and the torsional spring connector (39) of the outer ring (38).

FIG. 27 contains an isometric cut-away type view of the multiple-ring gimbal of FIG. 26 with the half-shells of the rings hidden to show the internal components and arrangements. FIG. 27 shows each ring containing pairs of diametrically opposite pivots. Except for the core and outer ring, each ring contains two pairs of pivots, each pair of pivots being set at 90 degrees to the other. Ring-shaped and stepped bushes provide the bearing surfaces for the pivots. Torsional spring connectors are located at the centre of each pivot and provide torsional connection between each adjacent ring. FIG. 27 also contains isometric views of one possible embodiment of the Torsional Spring Connector in assembled and exploded views. In this embodiment the exploded view shows the Torsional Spring Connector consists of upper and lower caps with internal blades between which sit rubber blocks providing spring and damping forces. A centre spring element (torque tube) is also shown.

FIG. 28 shows the Propulsor incorporating two, three-ring gimbals at the hubs of the rotors.

FIG. 32 shows a quasi-static representation of the yawing rotation of the helicopter from the application of a lateral force from the Propulsor from time (T)=0 to T=t. FIG. 32 shows how the control system of the Propulsor maintains the tilted angles of discs of Rotor 1 and Rotor 2 relative to the helicopter over the time period. FIG. 32 shows that as a result of the applied force $P_{LAT}$ the helicopter rotates in yaw. The rate of rotation of the helicopter is $\omega$ and any angular acceleration $\alpha$. To maintain the force produced by the Propulsor and to prevent the rotors reaching their travel limits the control system adjusts the cyclic actuation of each rotor (via each independent swashplate) as required to produce rates of rotation (i.e. rates of tilt) of each rotor disk (and any angular accelerations) that match those of the helicopter and thereby maintain the relative angles between each rotor disk and the helicopter. Note: Rotation in Yaw is shown but the same principle is applies to pitch and any combination of pitch and yaw.

FIG. 33 shows a quasi-static representation of the yawing rotation of the helicopter from the application of a horizontal force, containing lateral and longitudinal-forward force components, from the Propulsor from time T=0 to T=t. FIG. 33 shows how the control system of the Propulsor maintains the tilted angles of disks of Rotor 1 and Rotor 2 relative to the helicopter over the time period. FIG. 33 shows that as a result of the applied force $P_{TOTAL}$ the helicopter rotates in yaw and accelerates forwards. The rate of rotation of the helicopter is $\omega$ and any angular acceleration $\alpha$. As with FIG. 32, to maintain the force produced by the Propulsor and to prevent the rotors reaching their travel limits the control system adjusts the cyclic actuation of each rotor (via each independent swashplate)) as required to produce rates of rotation (tilt) of each rotor disk (and any angular accelerations) that match those of the helicopter and thereby maintain the relative angles between each rotor disk and the helicopter. Note: Rotation in yaw is shown but the same principle applies to pitch and any combination of pitch and yaw.

FIG. 34 shows a quasi-static representation of the yawing rotation of the helicopter from the application of a horizontal force, containing lateral and longitudinal-aft force components. The lateral component is the same as that of FIG. 33 and as with FIG. 33 the control system in FIG. 34 adjusts the cyclic actuation of each rotor (via each independent swashplate) as required to produce rates of rotation (tilt) of each rotor disk (and any angular accelerations) that match those of the helicopter and thereby maintain the relative angles between each rotor disk and the helicopter. Although the rotation, as presented, is anti-clockwise as in FIG. 33, the tilt of the rotor disks in FIG. 34 is opposite to that of FIG. 33. The longitudinal-aft force component may be due to either direct thrust or drag (for a helicopter already travelling at speed). This reversal of tilt resulting in the same yawing motion means that a simple control mechanism will result in the requirement for reversal of control input in some circumstances that would render the Propulsor impractical. The ODTV Propulsor in the highly dynamic environment, such as that of helicopter flight, will require an active (digital) control system to operate safely and effectively.

DETAILED DESCRIPTION

[Note: For ease of reference, an index of the reference numbers and symbols used in this Detailed Description section and the corresponding items/parts/assemblies shown in the Figures is included at the end of this Detailed Description section.]

The particular embodiments of the invention illustrated in FIGS. 2-28 and described in further detail below relate to a propulsion system (referred to as an Omni-Directional Thrust Vectoring (ODTV) Propulsor or simply the Propulsor for short) for a helicopter or similar rotorcraft, which has the ability to produce a thrust force of a desired magnitude, in any desired radial direction from the centre of the Propulsor, from a single driveshaft that is fixed in position. However, whilst the particular embodiments shown in FIGS. 2-28 will be discussed in the context of helicopters and similar rotorcraft, it is to be clearly understood that (as noted above) no limitation whatsoever as to the scope or application of the invention is to be inferred from this. The invention could therefore potentially also be used in a wide range of other applications or industries, including other aeronautical applications, marine applications, or even non-vehicle related industrial applications.

Figure 1:
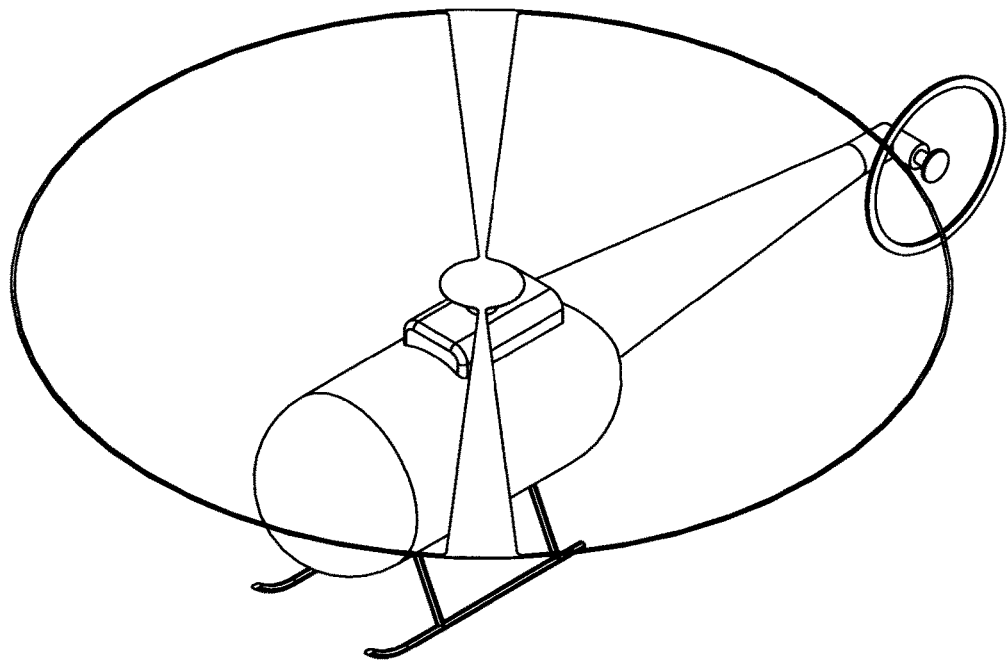
FIG. 1 is a schematic isometric view of the conventional helicopter.

As mentioned above, FIG. 1 illustrates a conventional single-main-rotor helicopter. The single-main-rotor helicopter in FIG. 1 (like most such helicopters) has a conventional single anti-torque tail-rotor for producing lateral thrust to balance the torque created by the main rotor. Embodiments of the ODTV Propulsor (or indeed other possible embodiments of the present invention) could replace the conventional single anti-torque tail-rotor on the tail of a single-main-rotor helicopter, and indeed this is what the ODTV Propulsor is used for in the particular embodiments discussed below.

The ODTV Propulsor in each of the particular embodiments discussed below is an external rotor system that is made up of at least two separate rotors that can together produce thrust of controllable magnitude and direction from a driveshaft that is in a fixed position relative to the helicopter. In the specific embodiments discussed below, the driveshaft (5) is an elongated straight driveshaft mounted in the helicopter's tail. The driveshaft (or a portion thereof) projects slightly from the rear of the helicopter's tail, and the rotors connect on the said projecting portion of the driveshaft. The driveshaft is oriented such that its longitudinal axis is generally parallel to the helicopter's forward axis (i.e. parallel to the direction of forward flight), and the driveshaft is able to rotate about its longitudinal axis.

The magnitude and direction of the thrust produced by the ODTV Propulsor is determined by summing (adding) the vectors corresponding to the thrust produced by each individual rotor. Hence, the overall thrust produced by the Propulsor is the sum of the individual rotors' thrust vectors. The combination of the individual thrust vectors produces a vector sum (or overall total) thrust force that can be directed in any selected radial direction from the centre of the ODTV Propulsor; that is, at any angle of azimuth and elevation about the centre of the ODTV Propulsor.

Figure 2:
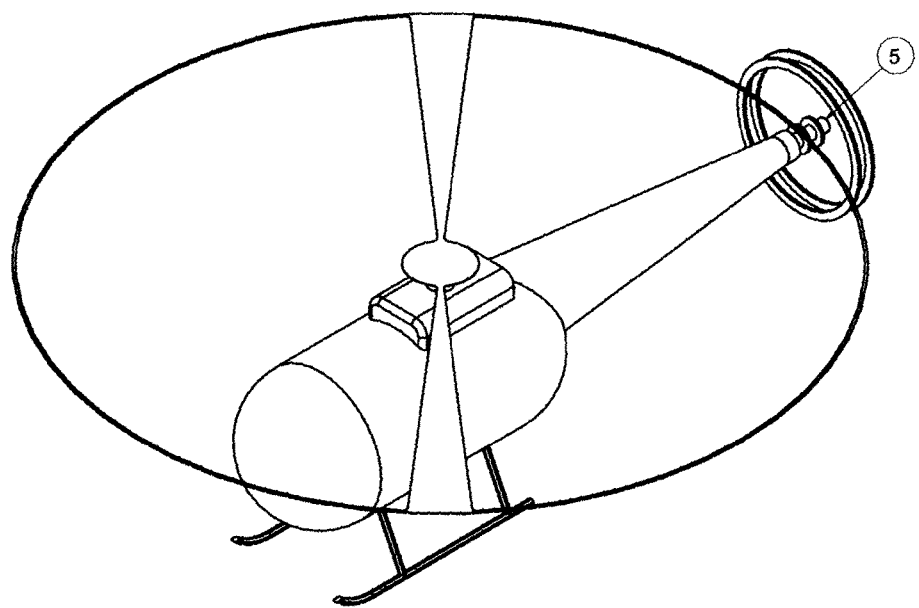
FIG. 2 contains a schematic isometric view of a single-main-rotor helicopter which has, as its tail rotor, an Omni-Directional Thrust-Vectoring Propulsor in accordance with possible embodiments of the present invention.
Figure 3:
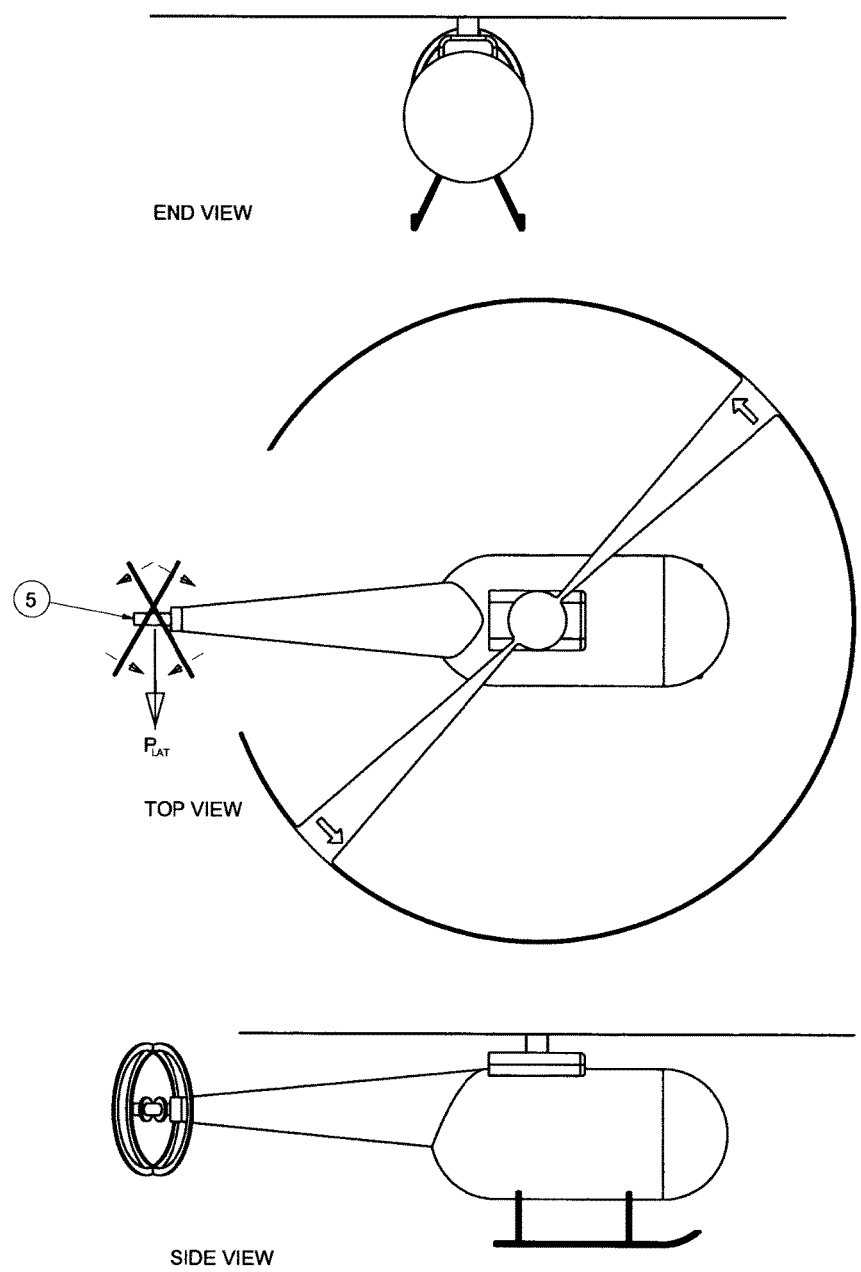
FIG. 3 contains schematic end, top and side views of the helicopter in FIG. 2 with the Omni-Directional Thrust-Vectoring Propulsor at the tail of the helicopter shown producing anti-torque lateral thrust for hover.
Figure 4:
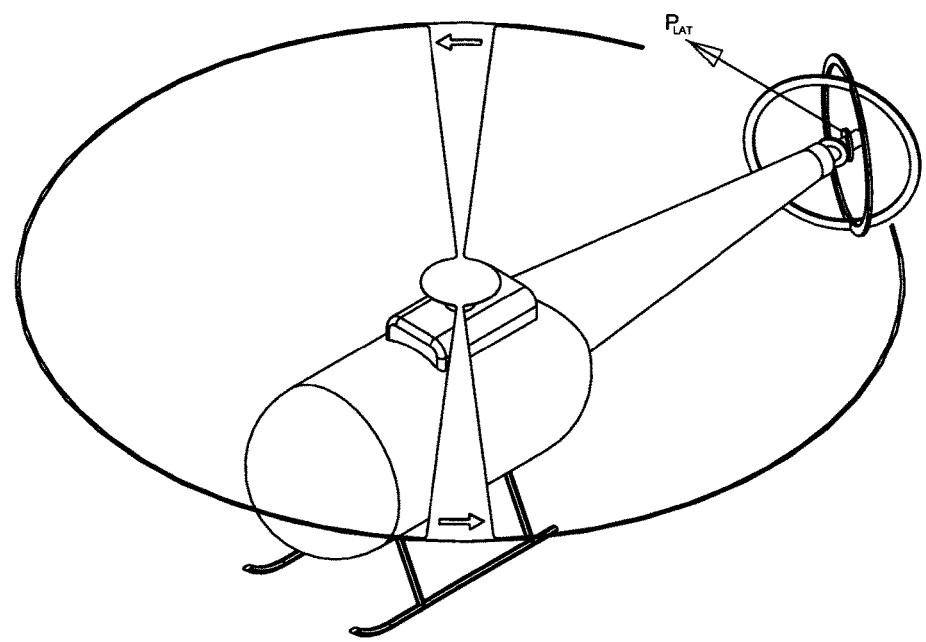
FIG. 4 is a schematic isometric view of the helicopter in FIG. 2 and, like in FIG. 3, the Omni-Directional Thrust-Vectoring Propulsor at the tail of the helicopter is shown producing anti-torque lateral thrust for hover.
Figure 5:
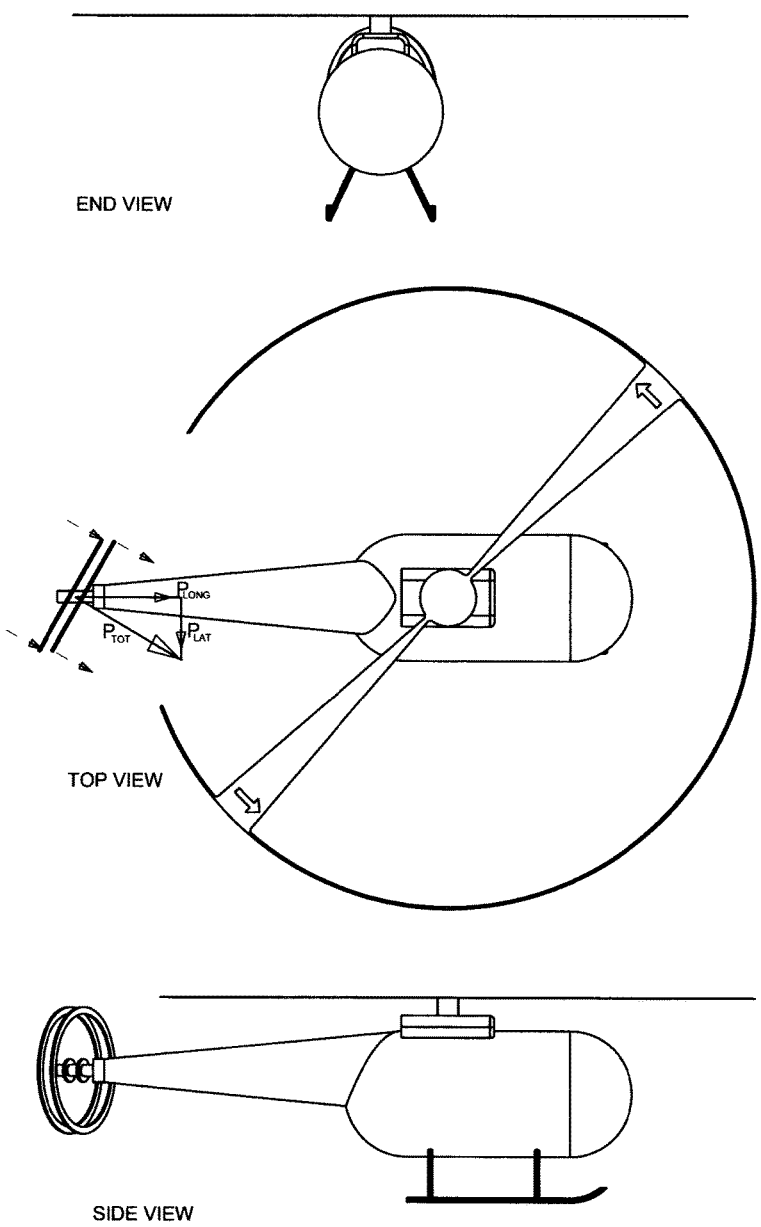
FIG. 5 contains schematic end, top and side views of the helicopter in FIG. 2 with the Omni-Directional Thrust-Vectoring Propulsor at the tail of the helicopter shown producing both anti-torque lateral thrust and also forward thrust for accelerating from hover or manoeuvring in forward flight.
Figure 6:
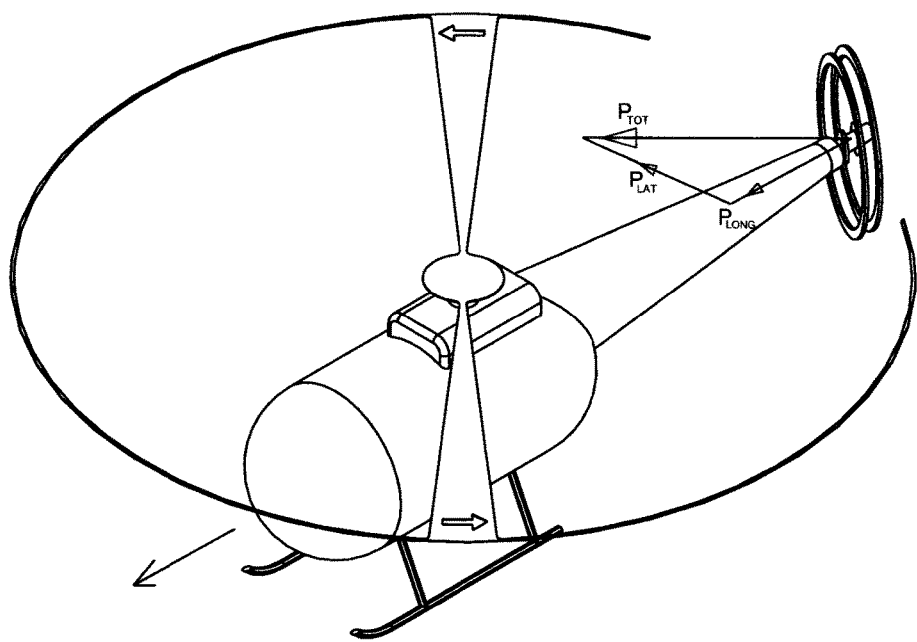
FIG. 6 is a schematic isometric view of the helicopter in FIG. 2 and, like in FIG. 5, the Omni-Directional Thrust-Vectoring Propulsor at the tail of the helicopter is shown producing both anti-torque lateral thrust and also forward thrust for accelerating from hover or manoeuvring in forward flight.
Figure 7:
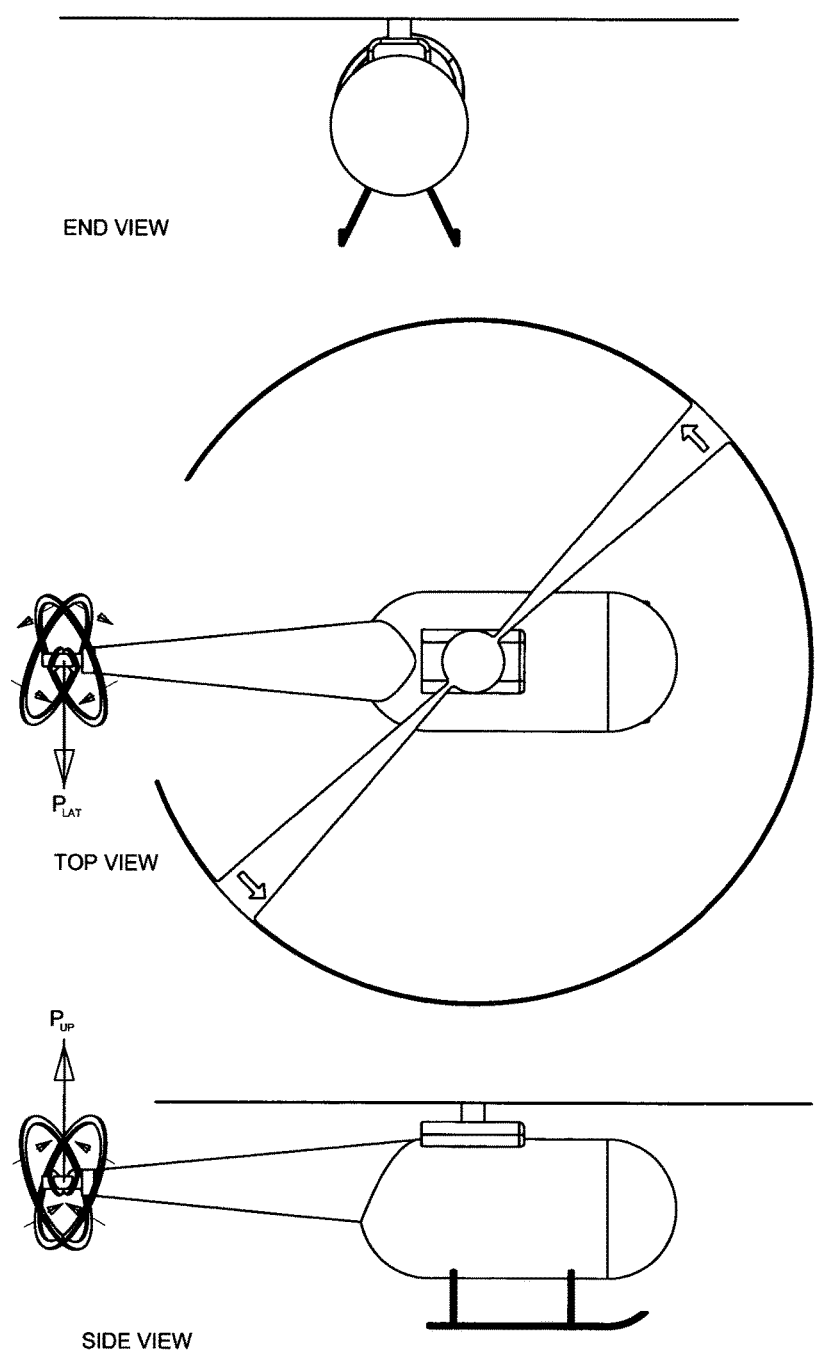
FIG. 7 contains schematic end, top and side views of the helicopter in FIG. 2 with the Omni-Directional Thrust-Vectoring Propulsor at the tail of the helicopter shown producing both anti-torque lateral thrust and also up thrust for pitching the helicopter nose-down in hover.
Figure 8:
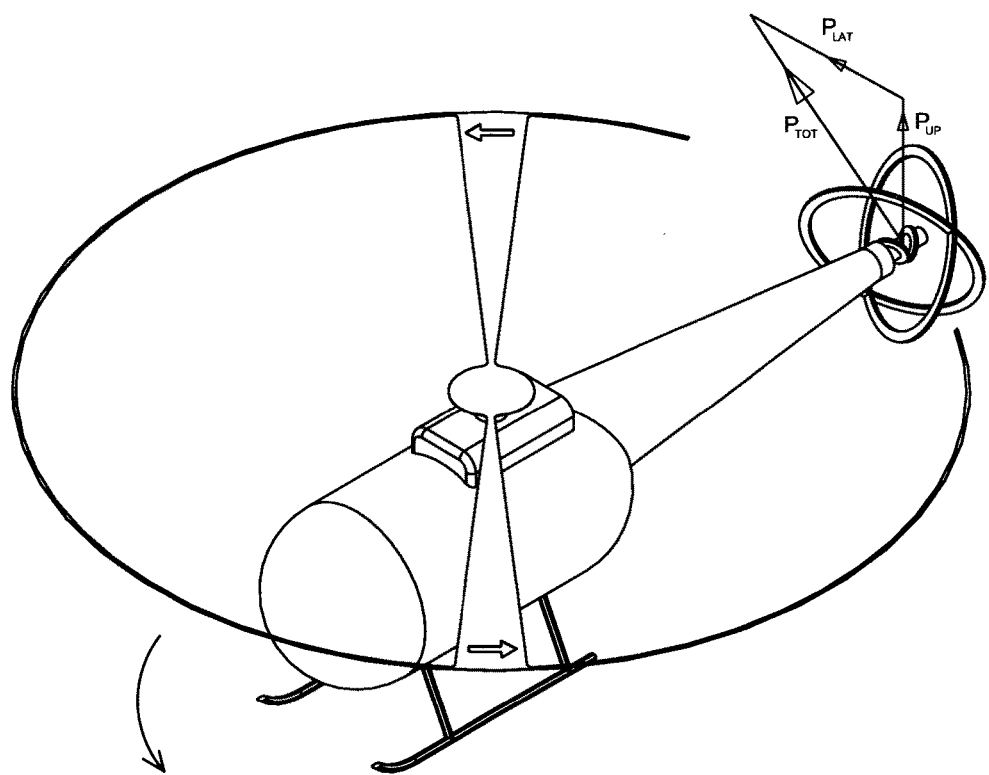
FIG. 8 contains a schematic isometric view of the helicopter in FIG. 2 and, like in FIG. 7, the Omni-Directional Thrust-Vectoring Propulsor at the tail of the helicopter is shown producing both anti-torque lateral thrust and also up thrust for pitching the helicopter nose-down in hover.
Figure 9:
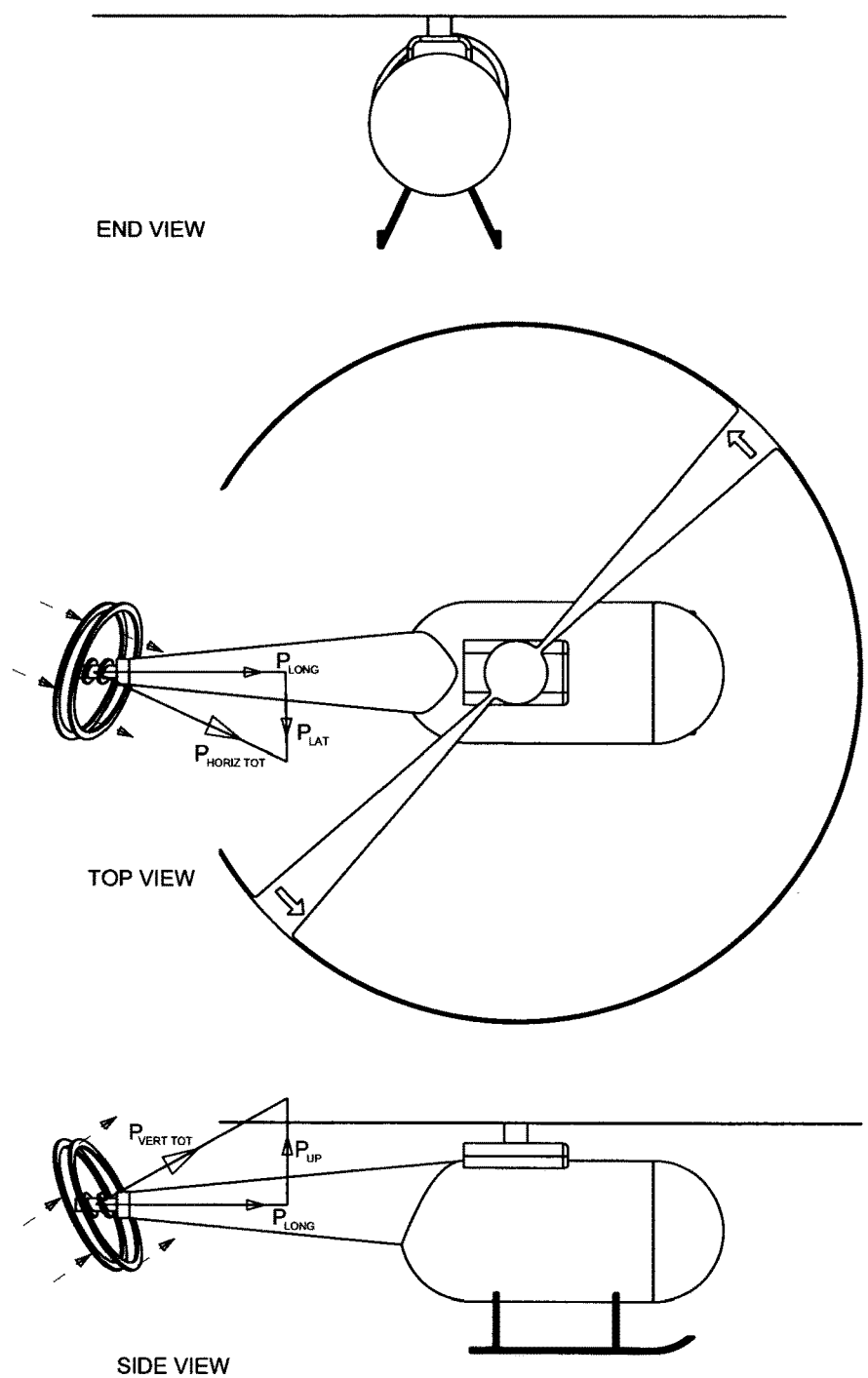
FIG. 9 contains schematic end, top and side views of the helicopter in FIG. 2 with the Omni-Directional Thrust-Vectoring Propulsor at the tail of the helicopter shown producing (a) anti-torque lateral thrust, (b) up thrust for pitching nose-down and (c) forward thrust for acceleration from hover or manoeuvring in forward flight.
Figure 10:
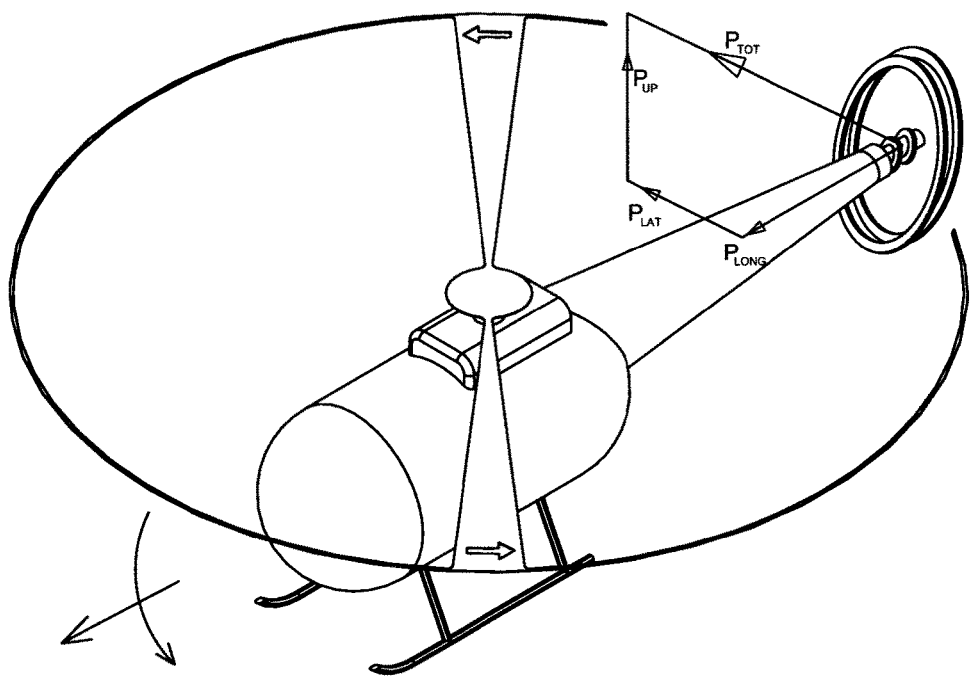
FIG. 10 contains a schematic isometric view of the helicopter in FIG. 2 and, like in FIG. 9, the Omni-Directional Thrust-Vectoring Propulsor at the tail of the helicopter is shown producing (a) anti-torque lateral thrust, (b) up thrust for pitching nose-down and (c) forward thrust for acceleration from hover or manoeuvring in forward flight.

Each separate rotor of the ODTV Propulsor is capable of independent control. More specifically, as shown in FIG. 2 for example, the un-pivoted or un-tilted orientation of each rotor of the ODTV Propulsor is in a plane normal to the longitudinal axis of the driveshaft. However, each rotor (and the disk defined by each rotor as it rotates about the axis of the driveshaft) is capable of tilting out of the plane normal to the driveshaft. In preferred embodiments (including the particular embodiments discussed below), each rotor (and the disk defined when it rotates about the axis of the driveshaft) is capable of tilting out of the plane normal to the driveshaft by at least 30 degrees in any direction. It is thought that this should generally be sufficient to allow the ODTV Propulsor to efficiently produce the lateral and/or vertical thrust force components required to control the helicopter.

Those skilled in the art will recognise that 30 degrees, being the amount that each rotor is capable of tilting in any direction out of the plane normal to the driveshaft, is not merely an amount chosen at random. On the contrary, it will be understood that $\sin(30°)=\frac{1}{2}$. Accordingly, if F is the force produced by a single rotor (in the direction normal to the plane of that rotor's disk), and if that disk is oriented 30 degrees out of the plane normal to the driveshaft, it follows that the component of the force F produced by that individual rotor which is in a direction normal to the driveshaft is F/2 (i.e. half F). From this, those skilled in the art will also appreciate that it is possible for two separate rotors to be oriented in such a way that each one produces (i.e. they both produce) a force having a component with magnitude F/2 in the same direction normal to the driveshaft, such that the two said components sum to give an overall force component in the said direction normal to the driveshaft of magnitude F/2+F/2=F. The significance of this will be discussed further below.

In each of the particular embodiments described in detail herein, the ODTV Propulsor is an external rotor or propeller system made up of at least two independent rotor subsystems (or rotor assemblies).

Figure 12:
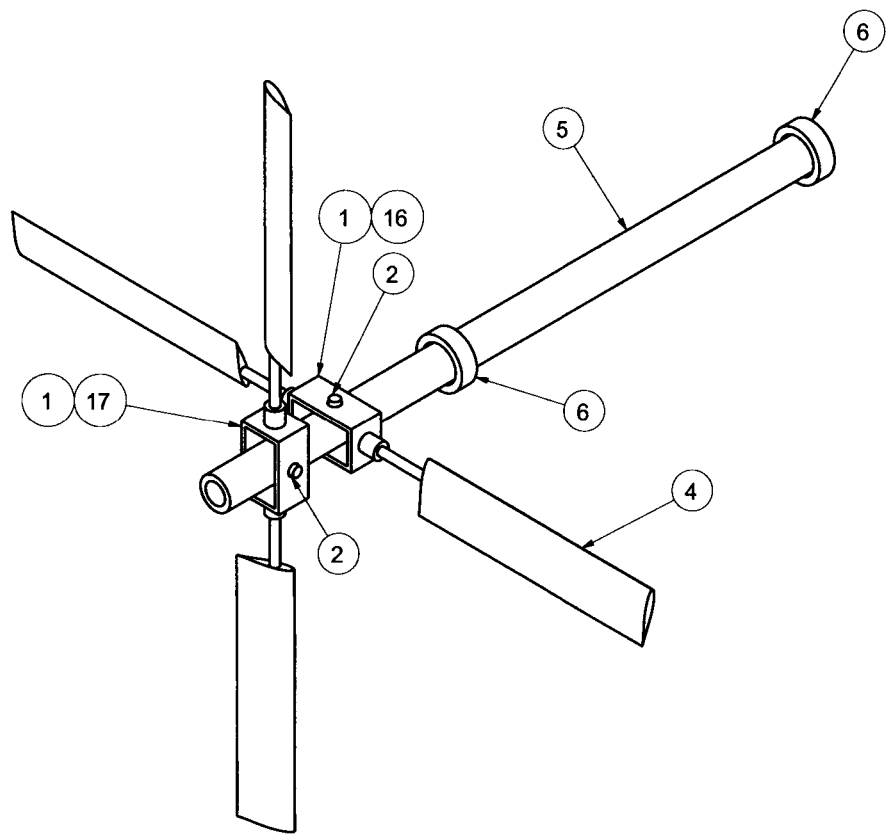
FIG. 12 contains a schematic isometric view of a dual rotor system where the two rotors are set at an angle of azimuth to each of 90 degrees. When the control system (not shown) comprises a single swashplate control system (one swashplate controlling both rotors) for collective (and sometimes cyclic) displacement then
Figure 13:
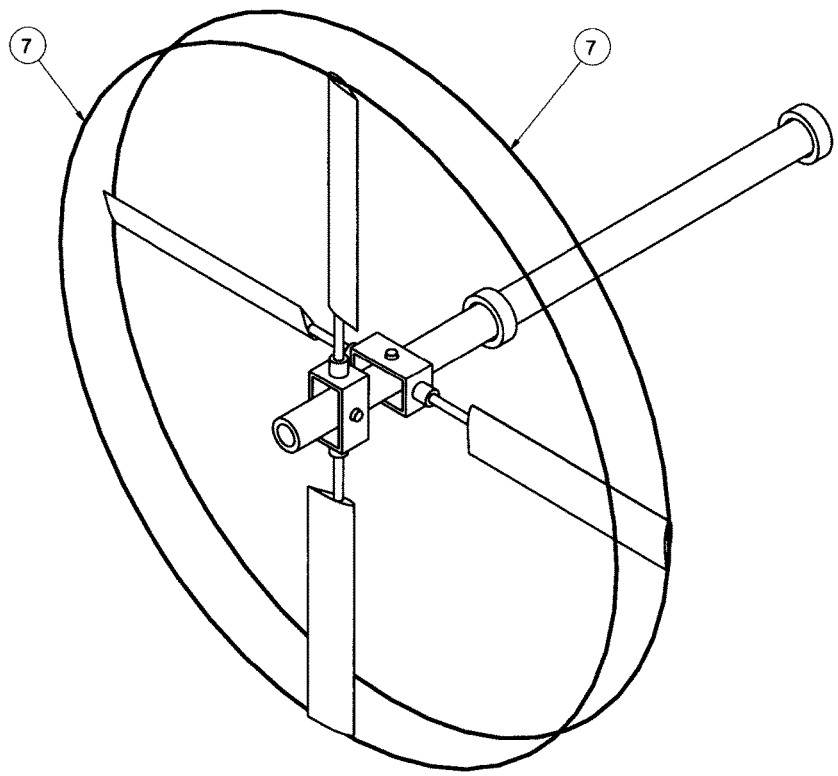
FIG. 13 is similar to FIG. 12 in that it contains a schematic isometric view of FIG. 12 and also includes traces of the paths swept by the blade tips of each blade/rotor when the driveshaft rotates.
Figure 14:
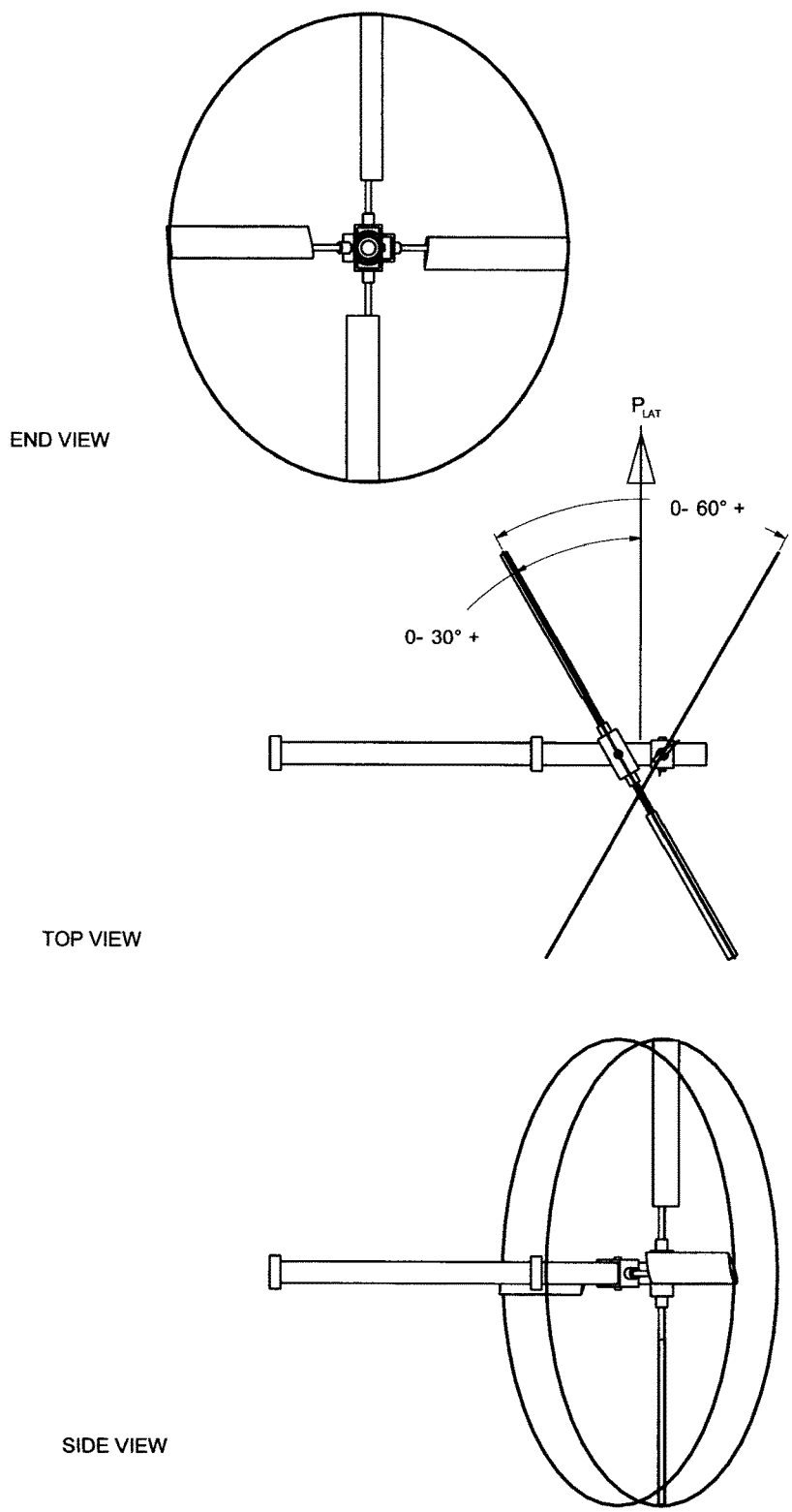
FIG. 14 contains schematic end, top and side views of the first model of Omni-Directional Thrust-Vectoring Propulsor showing the two rotor disks tilted in opposite directions and oriented to produce a lateral thrust force. This can only be achieved by a control system incorporating two independent swashplates, each of which incorporate both collective and cyclic control capabilities.
Figure 15:
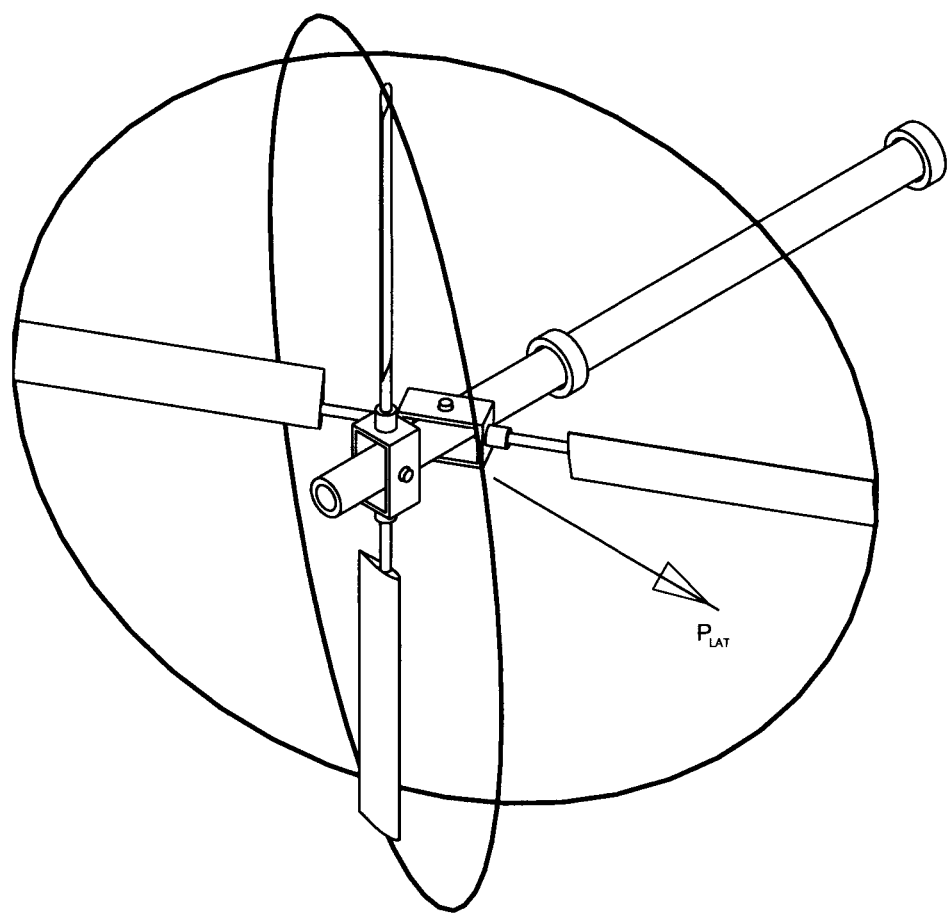
FIG. 15 contains a schematic isometric view of the first model of Omni-Directional Thrust-Vectoring Propulsor in FIG. 14 with the two rotor disks tilted in opposite directions and oriented to produce a lateral thrust force.
Figure 16:
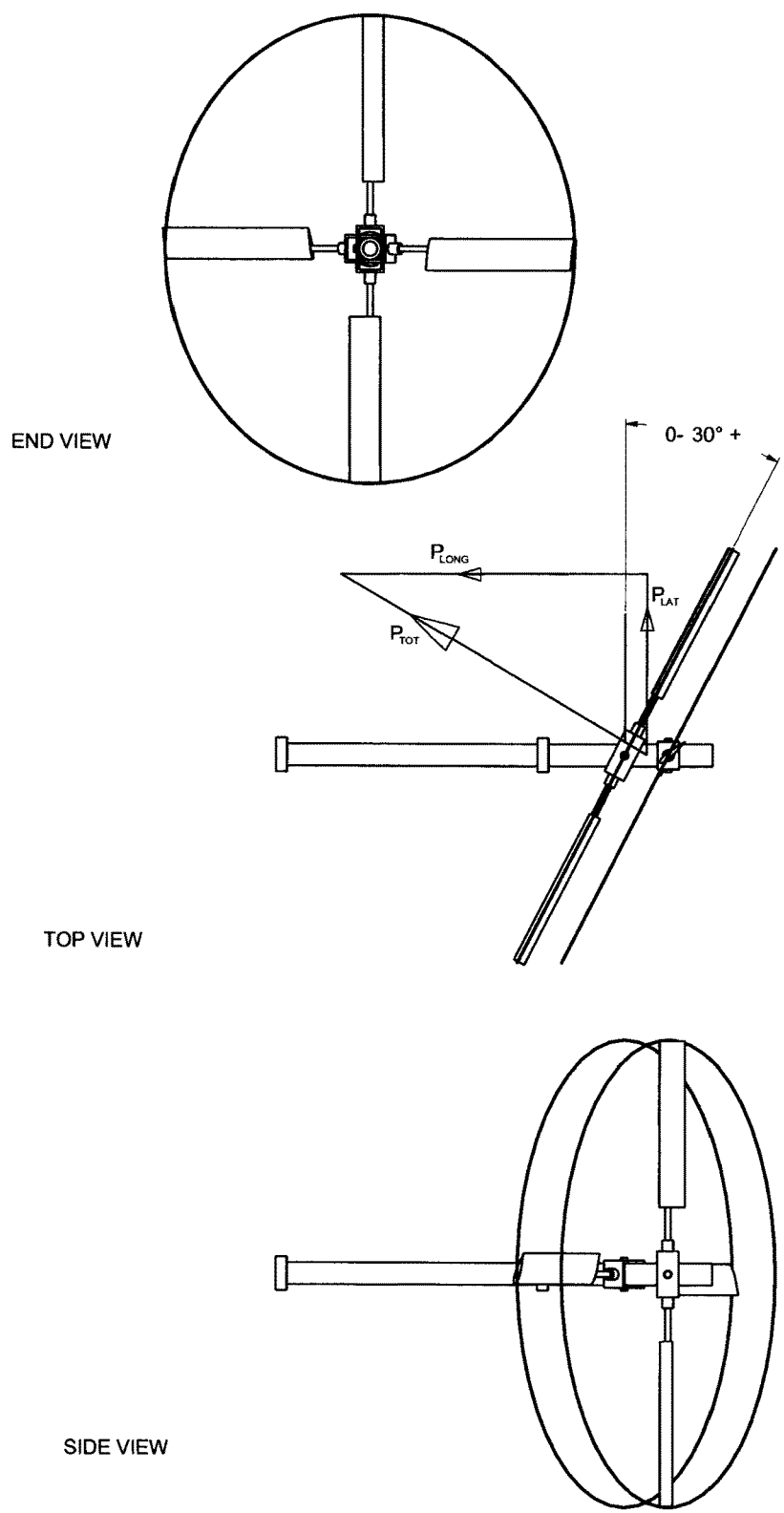
FIG. 16 is similar to FIGS. 14 and 15 in that it contains schematic end, top and side views of the first model of Omni-Directional Thrust-Vectoring Propulsor, however in FIG. 16 the two rotor disks are tilted in the same direction and oriented to produce a lateral and forward thrust force.
Figure 17:
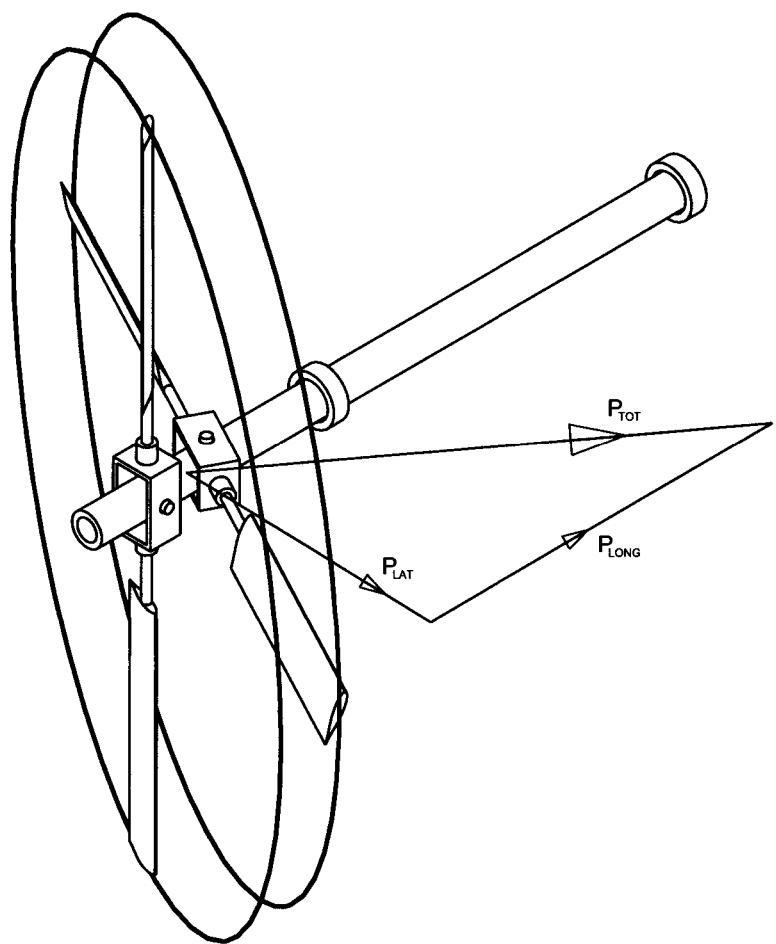
FIG. 17 contains a schematic isometric view of the first model of Omni-Directional Thrust-Vectoring Propulsor as in FIG. 16 with the two rotor disks tilted in the same direction and oriented to produce a lateral and forward thrust force.
Figure 18:
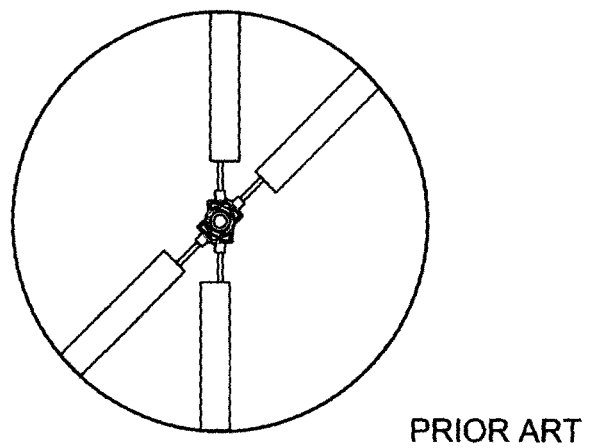
FIG. 18 contains schematic end view and isometric view of a dual rotor system where the two rotors are set at an angle of azimuth to each other that is less than 90 degrees. When the control system (not shown) comprises a single swashplate control system (one swashplate controlling both rotors) for collective (and sometimes cyclic) displacement then
Figure 18:
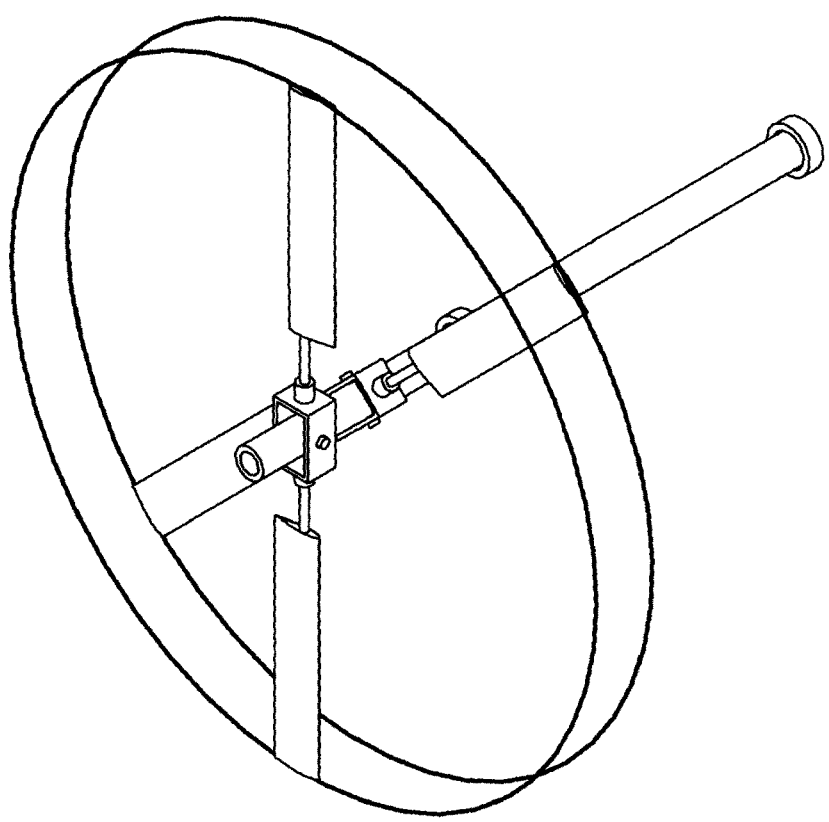
Figure 19:
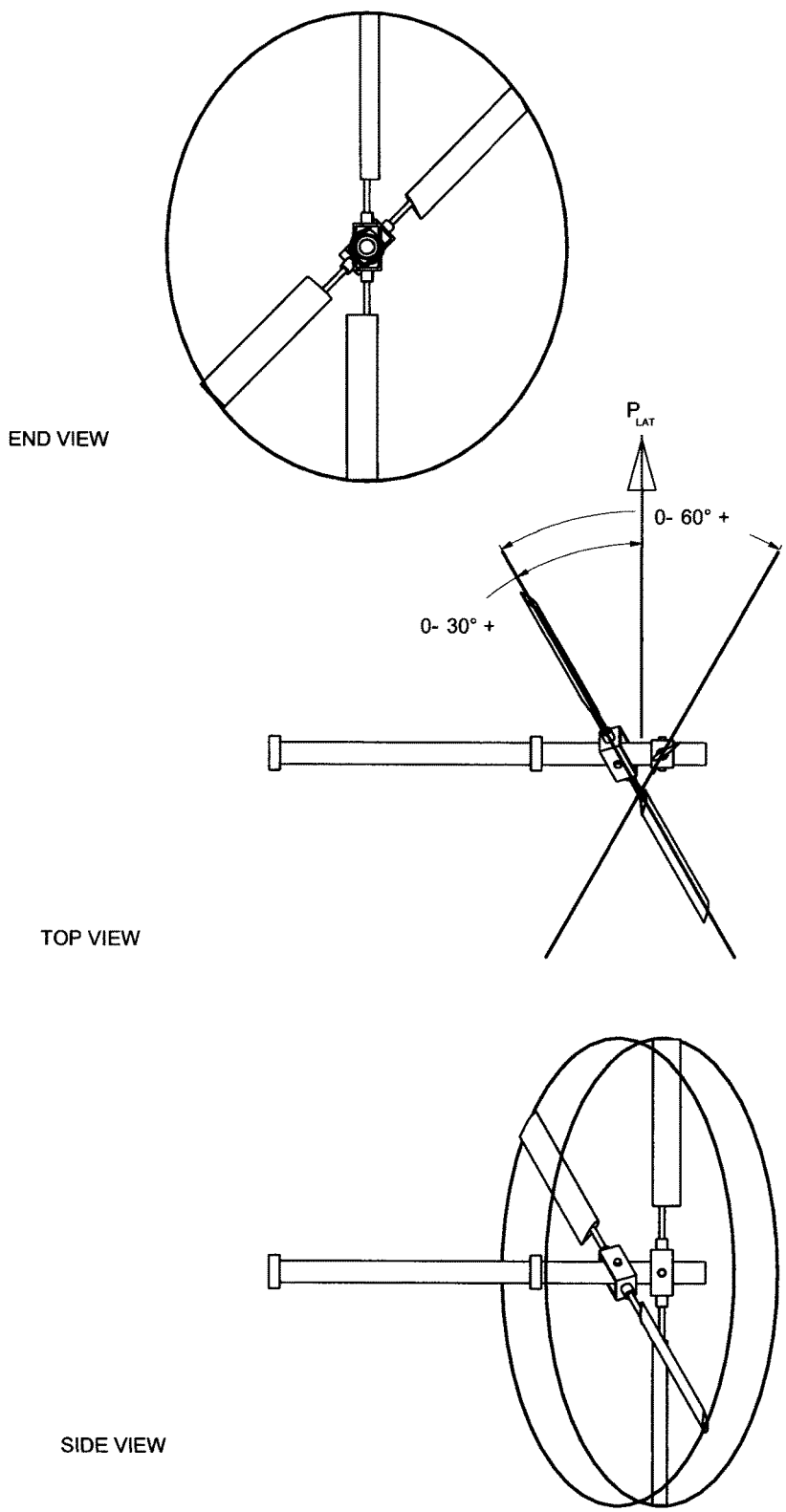
FIG. 19 contains schematic end, top and side views of the second model of Omni-Directional Thrust-Vectoring Propulsor, in that in FIG. 19 the two rotor disks are tilted in opposite directions and oriented to produce a lateral thrust force. Like in FIG. 14, this can only be achieved by a control system incorporating two independent swashplates, each of which incorporate both collective and cyclic control capabilities.
Figure 20:
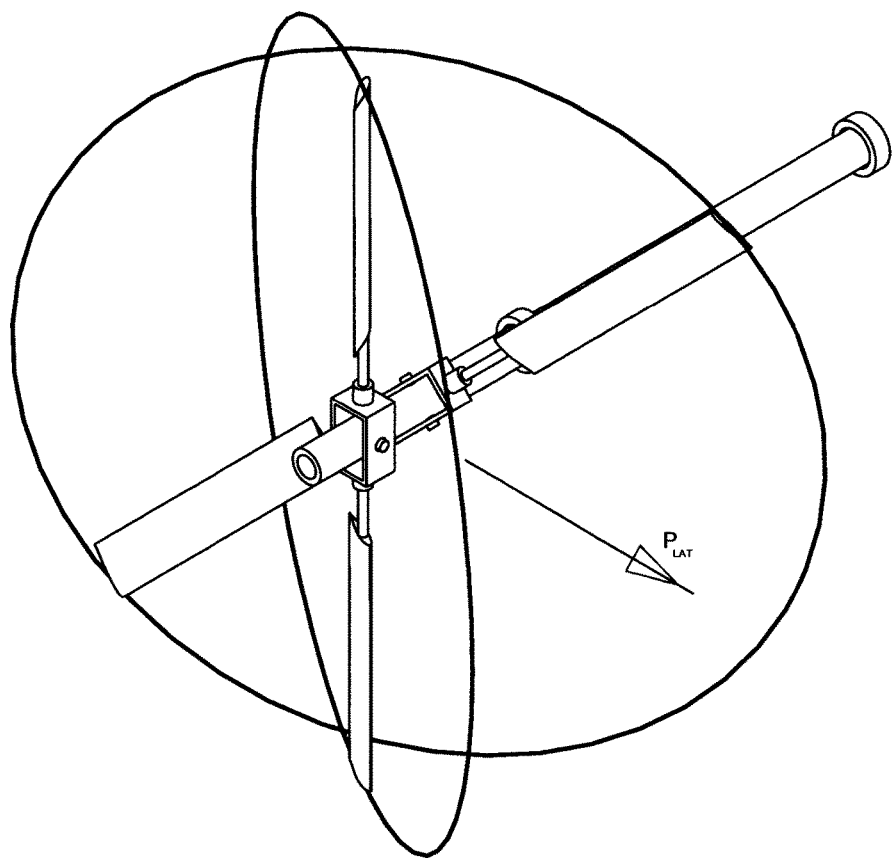
FIG. 20 contains a schematic isometric view of the second model of Omni-Directional Thrust-Vectoring Propulsor in FIG. 19 with the two rotor disks tilted in opposite directions and oriented to produce a lateral thrust force.

FIGS. 12 and 18 show basic dual rotor arrangements. When the control system (not shown in figures) comprises a single swashplate control system (one swashplate controlling both rotors) for collective (and sometimes cyclic) displacement then FIG. 12 represents various prior art. However, when the control system (not shown) comprises an independent swashplate for each rotor and each swashplate incorporates both collective and cyclic control functions this would be the first model of the Omni-Directional Thrust-Vectoring Propulsor.

Figure 11:
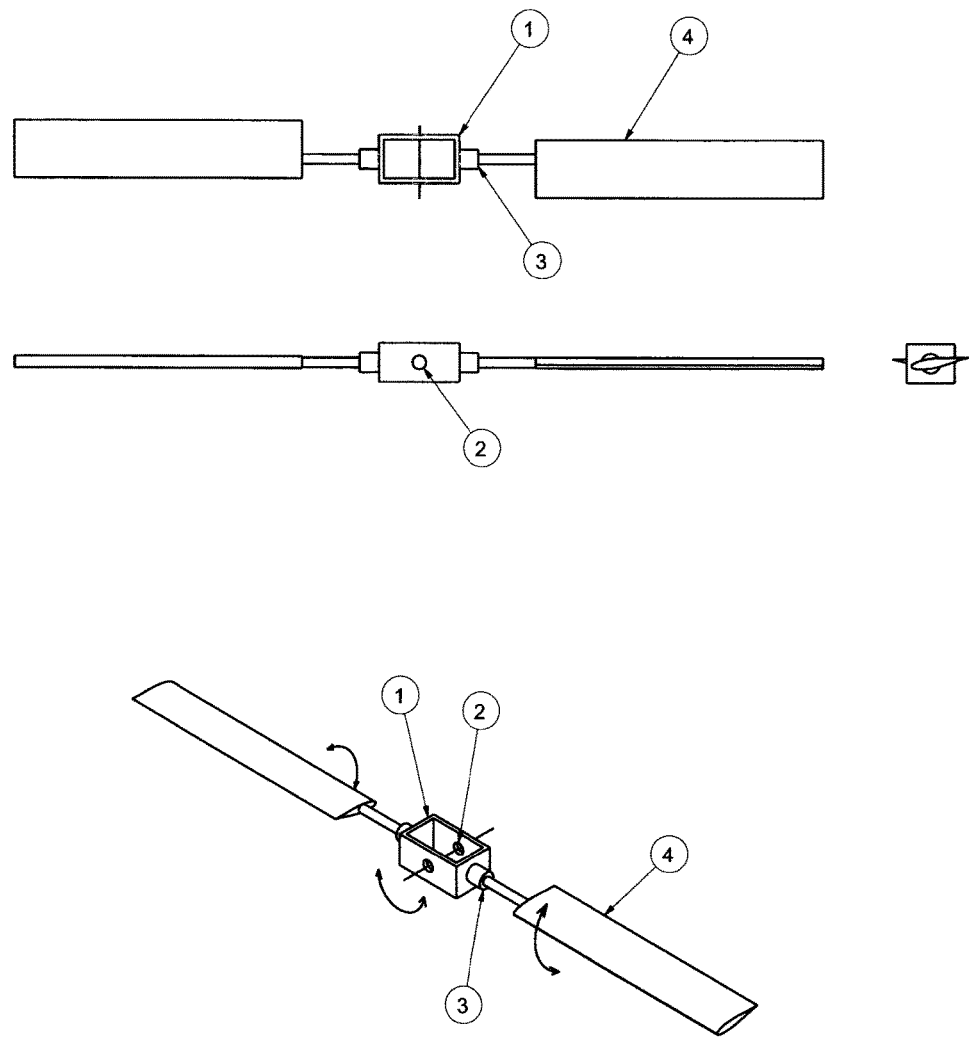
FIG. 11 contains schematic top, front, side and isometric views of prior art—a simplified model of an independent semi-rigid two bladed teetering rotor. Control system components are omitted in FIG. 11 for clarity.
Figure 21:
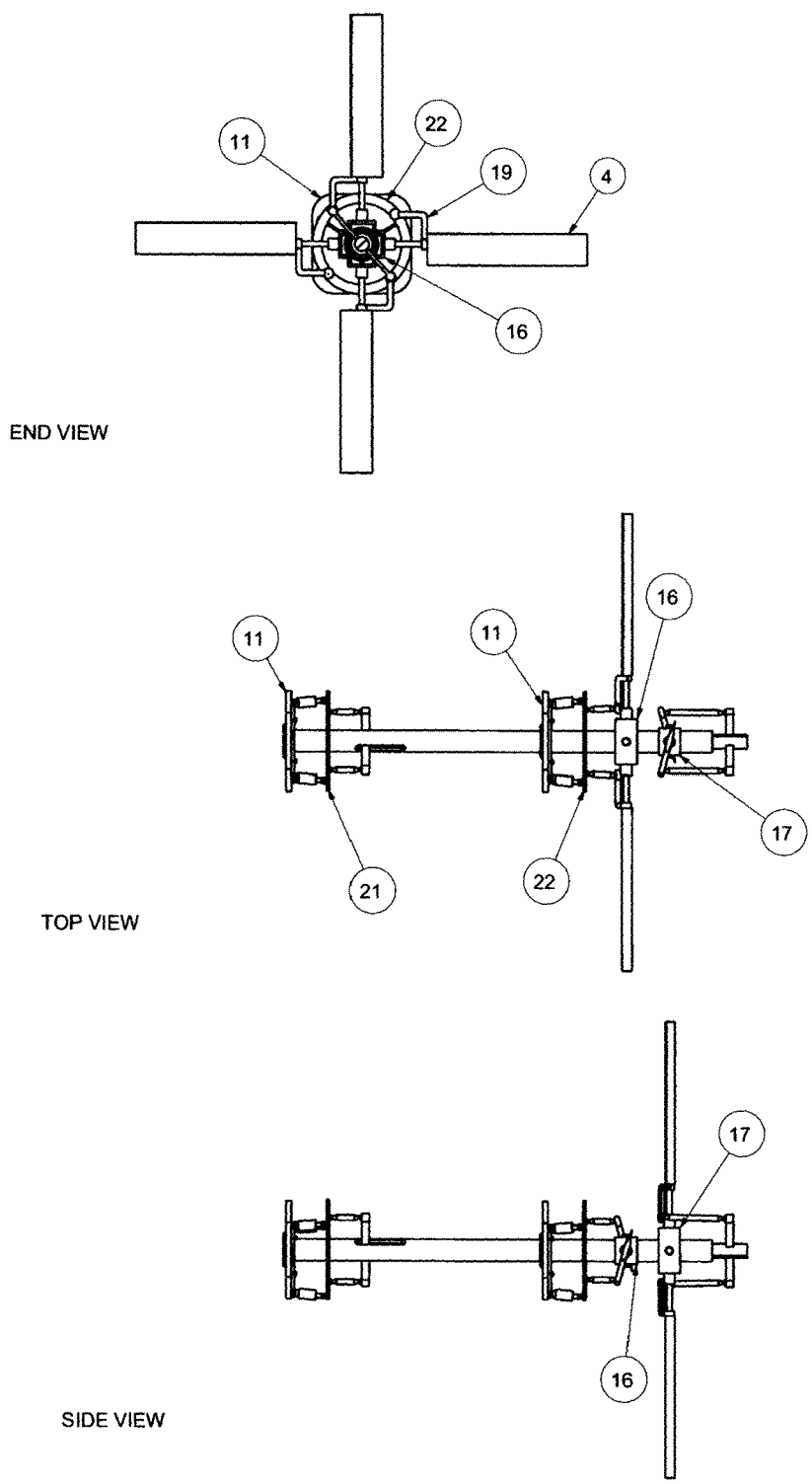
FIG. 21 is similar to FIG. 14 in that it contains schematic end, top and side views of the first model of Omni-Directional Thrust-Vectoring Propulsor, however
Figure 22:
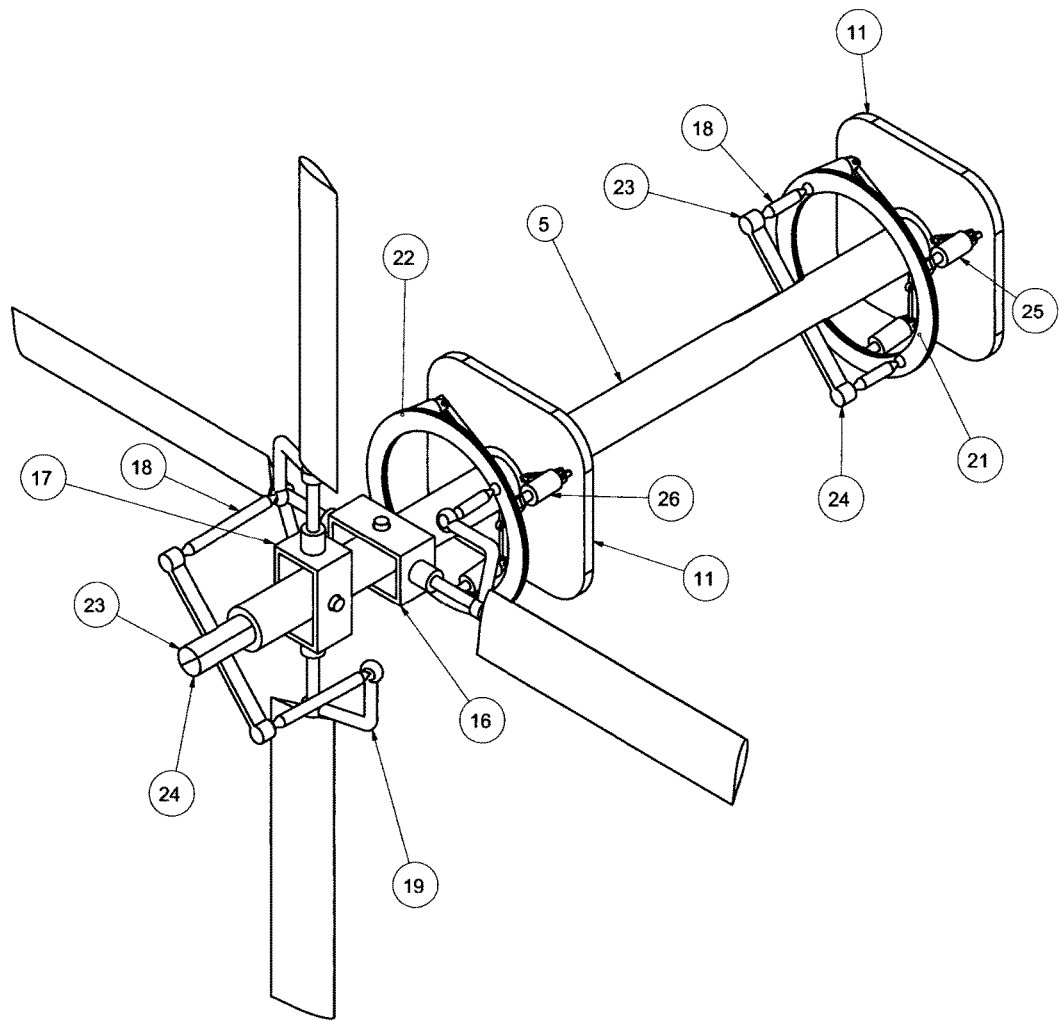
FIG. 22 contains a schematic isometric view of the Omni-Directional Thrust-Vectoring Propulsor and control system in FIG. 21.
Figure 23:
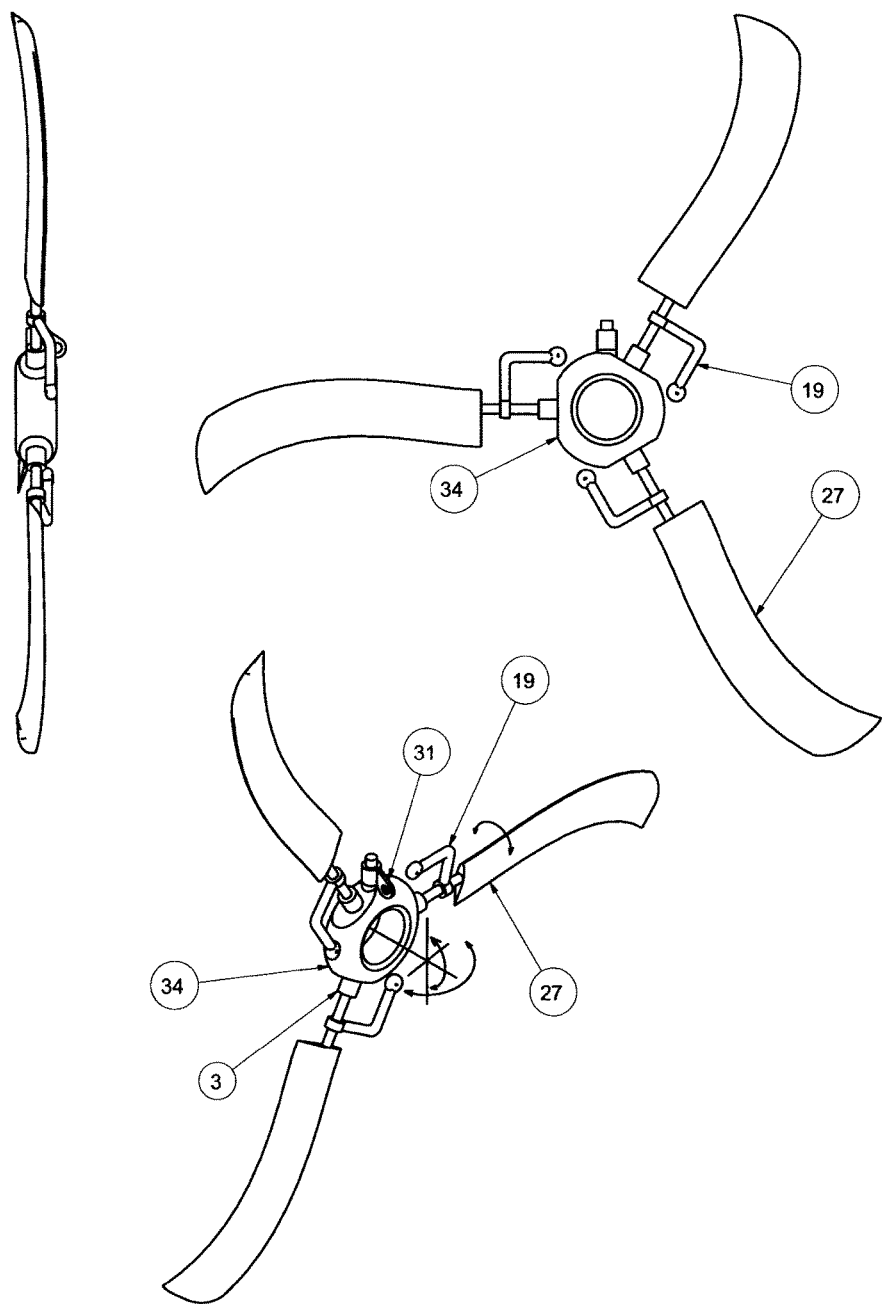
FIG. 23 contains schematic side, front and isometric views of a simplified model of an independent, semi-rigid, three bladed tilting rotor assembly. The rotor tilts on a spherical hub with a torque link. Control system components are omitted in FIG. 23 for clarity. An alternative to the rotor hub pictured in FIG. 23 may be a single-ring or multiple-ring gimbal that would produce the effect of a spherical hub with improved axial and torsional load carrying capabilities. The multiple-ring gimbal having greater torsional load transfer efficiency at large angles of deflection than the teetering or single-ring gimbal rotor hubs.
Figure 24:
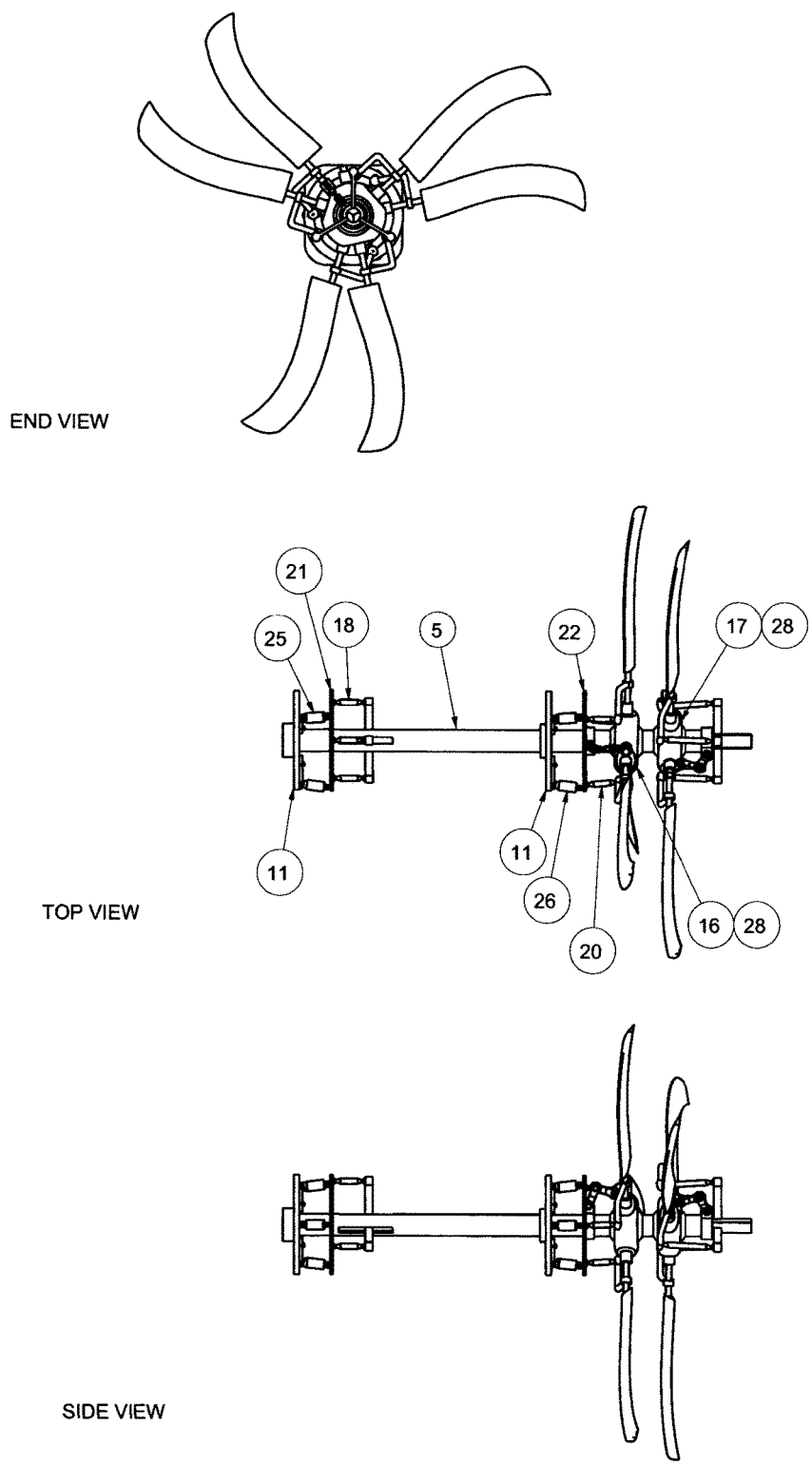
Figure 25:
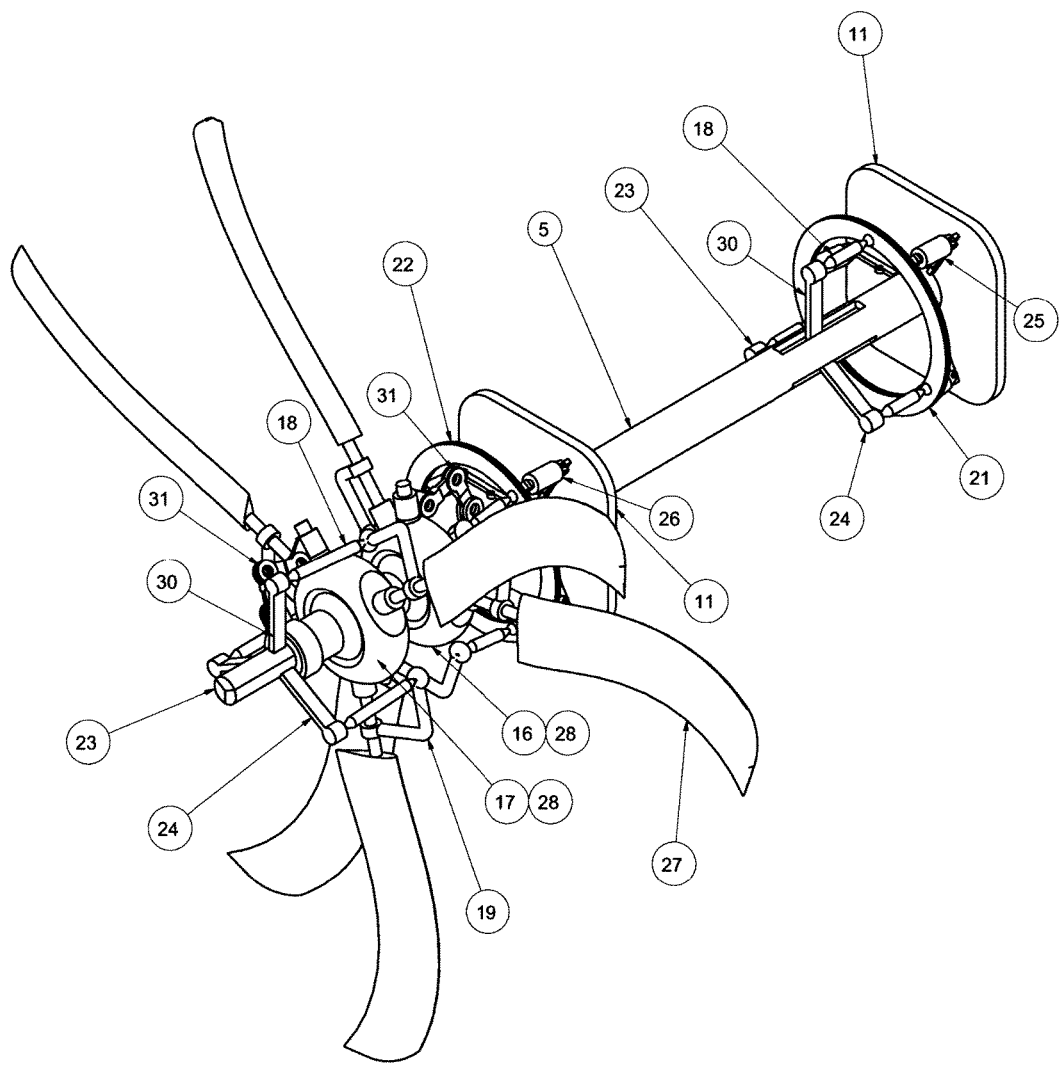
FIG. 25 contains a schematic isometric view of a third model of the Omni-Directional Thrust-Vectoring Propulsor shown in FIG. 24.

FIGS. 21 and 22 depict a first model of ODTV Propulsor with the control mechanisms shown. It will be seen that, in the first model, each independent rotor assembly (16)(17) is arranged to be co-axial and co-rotational with the other independent rotor assembly (17)(16). Hence, both rotor assemblies are located/mounted on, and driven by, the same driveshaft (5). Each independent rotor assembly (16)(17)

comprises a semi-rigid, teetering (rocking), two bladed rotor of the type shown in various views in FIG. 11.

Referring next to FIGS. 14-17, 21 and 22, it can be seen that each blade (4)(27) of each rotor assembly (16)(17) is variable in the angle of attack it makes to the air. That is the angle of attack (or pitch) of each blade can be varied. Furthermore, each blade of each rotor assembly is independently variable in pitch such that the pitch of each set of blades of each rotor assembly is variable both cyclically and collectively. Cyclic and collective variation of blade pitch, and the effects they cause, will be familiar to those skilled in the art. Therefore, only a brief summary of each is given below.

> In cyclic variation, the pitch angle of each blade of a given rotor changes "cyclically". That is, the pitch of each blade changes depending upon the position of that blade in its rotation around the driveshaft, such that all respective blades of the rotor have the same angle of incidence when at the same point in the cycle (i.e. when at the same angle of azimuth about the driveshaft). Each blade therefore completes one full pitch variation cycle for each revolution of the driveshaft. A cyclic change in pitch has the effect of changing the angle of attack of, and thus the lift generated by, a single blade at different positions around the rotor disk.
>
> Collective variation is where the pitch of a blade is increased or decreased at the same time and in the same sense as all other blade(s) of the same rotor. Hence, the pitch angles of all blades of the rotor change together "collectively" (i.e. all at the same time and all in the same way, irrespective of the respective positions/angles of azimuth of the individual blades about the driveshaft centreline).

Consequently, in the present context, for a given rotor that includes two blades like the rotor illustrated in FIG. 11, collective change means that the pitch of one blade is increased or decreased at the same time and in the same sense as the opposite blade of the same rotor. In contrast, for a rotor with two diametrically opposed blades like in FIG. 11, cyclic change may mean that the pitch of one blade is increased or decreased at the same time but in the opposite sense to the opposing blade of the same rotor.

Referring next to FIGS. 21 and 22, it can be seen that, in the first model of ODTV Propulsor, the pitch of each blade (4) of each rotor assembly (16)(17) is actuated by a pitch change lever arm (19) connected to the root (or inner end) of the blade. The pitch change lever arm is in turn actuated by a pitch change rod system (18)(20)(23)(24) connected to a swashplate or wobble plate (12)(13)(21)(22). Movement of the swashplate along the axis of the driveshaft (5) produces collective pitch change in the blades of the connected rotor. Rotation of the swashplate out of a plane perpendicular to the axis of the driveshaft (5) produces cyclic pitch changes in blades of the connected rotor. Each independent rotor assembly (16)(17) is actuated by its own, independent swashplate.

As will be evident from the explanation above, collective pitch change of the blades of a rotor produces a thrust force in a direction perpendicular to the disk swept by that rotor. On the other hand, cyclic pitch change of the blades of a rotor produces an imbalance of forces across the disk swept by that rotor and causes the said disk to tilt out of a plane perpendicular to the axis of the driveshaft (or otherwise out of the current plane of the disk) in accordance with the principle of gyroscopic precession. The concept of gyroscopic precession will be familiar to those skilled in the art and need not be discussed herein.

Referring again to FIGS. 21 and 22, it will be seen that the forward most rotor assembly (16) is actuated by a swashplate (12)(22) which is located immediately forward of that rotor. The aft most rotor assembly (17) may also be actuated by a remote swashplate (21) which is located forward of the forward rotor swashplate (12). In this case, the remote swashplate (21) is connected to the aft rotor assembly by two or more push-pull rods (23)(24)(30) which run up the inside of the driveshaft (5) so that the aft rotor assembly (17) is actuated by pitch change rods located at the aft end of the driveshaft. The push-pull rods inside the driveshaft may be arranged separately or concentrically.

Referring to FIGS. 14, 15, 16, 17, 19 and 20—the ODTV Propulsor therefore consists of at least two independently controlled rotors each of which, when rotated by the driveshaft (5), forms a disk (7). Each disk can be independently controlled such that each can be tilted or rotated out of a plane perpendicular to the axis of the driveshaft, to a selected angle, by cyclic pitch change of the blades of that rotor. At the selected orientation of tilt of the disk of a said independent rotor, the pitch of the blades of that rotor can then be collectively set (by collective control) to an angle of attack so as to produce a thrust force in a direction perpendicular to the plane of that disk. The said thrust force may be set so as to be upward from the plane of the disk or downward from the plane of the disk. The component of the thrust force that is perpendicular to the axis of the driveshaft can be in any selected angle of azimuth about the axis of the driveshaft. The component of the thrust force that is parallel to the axis of the driveshaft can be selected to be in the forward or aft direction.

In the particular models of ODTV Propulsor (i.e. the particular embodiments of the invention) described in detail herein, there are at least two independent rotors capable of producing individual thrust forces in different directions and of different magnitudes. Consequently the vector sum of these two thrust forces is the total force produced by the ODTV Propulsor which by careful control of the independent rotors can be set at any radial direction from the centre of the ODTV Propulsor.

Resolving the vector sum thrust force of the ODTV Propulsor into coordinates based on a vehicle-based coordinate system (wherein the vehicle-based coordinate system comprises mutually perpendicular axes corresponding to the vehicle's longitudinal (forward), lateral (sideways) and vertical (up/down) directions, as shown in the Figures) produces component vector forces in the longitudinal, lateral and vertical directions. These component vector forces can produce forward thrust (or aft thrust or drag), yaw and/or pitch, respectively, of the vehicle. These forces can be produced individually or in any combination.

Figure 30:
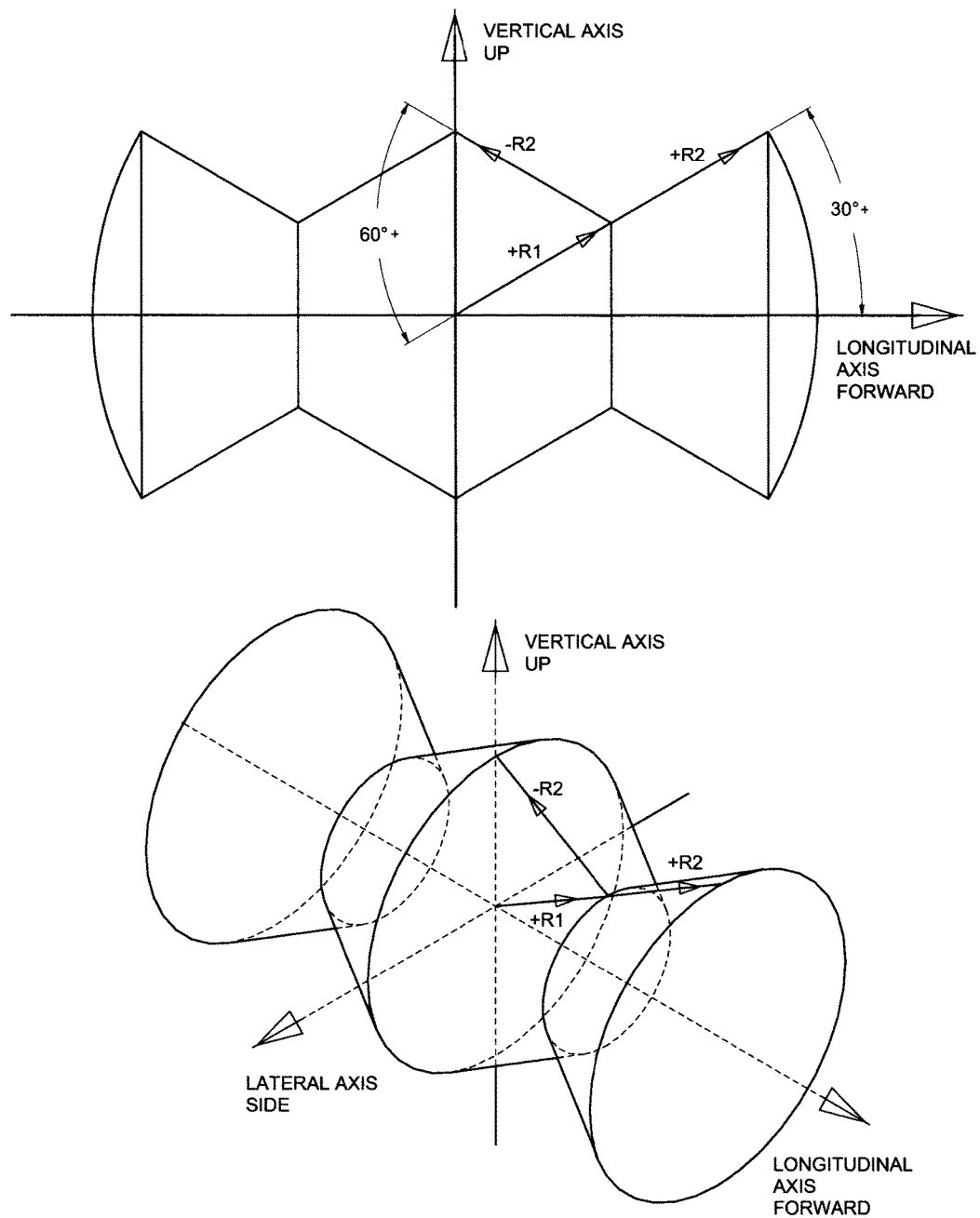
FIG. 30 contains diagrammatic side-on and isometric representations of the maximum thrust envelope of an Omni-Directional Thrust-Vectoring Propulsor (e.g. according to, say, the first, second, third or forth model) when the maximum angle of tilt of each rotor is 30 degrees or more and all blades on each rotor consist of symmetrical aerofoils with nil blade twist (nil washout). In this regard, the angle of tilt of each rotor is measured from a plane perpendicular to the driveshaft's longitudinal axis.
Figure 31:
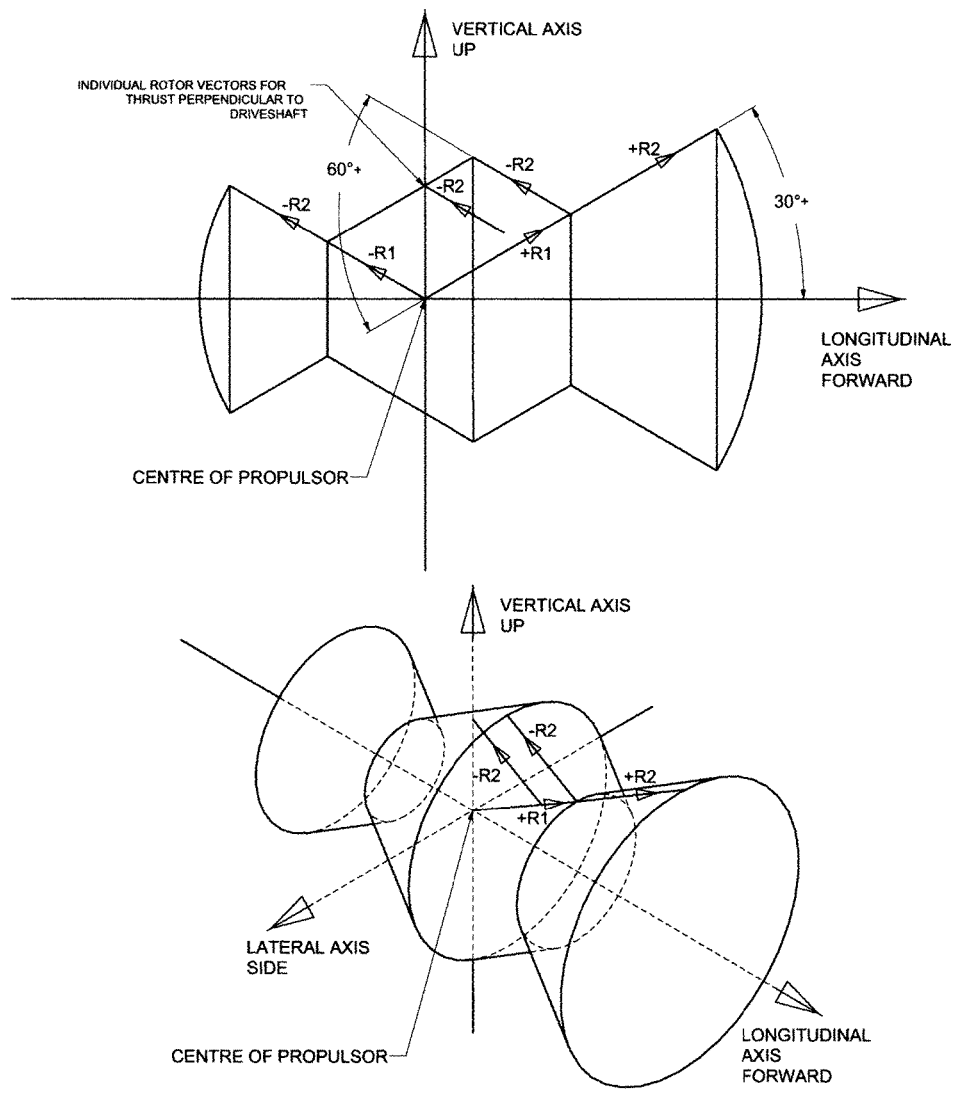
FIG. 31 is similar to FIG. 30 in that it also contains diagrammatic side-on and isometric representations of the maximum thrust envelope of an Omni-Directional Thrust-Vectoring Propulsor when the maximum angle of tilt of each rotor is 30 degrees or more. However, unlike FIG. 30, FIG. 31 applies to the situation where the Omni-Directional Thrust-Vectoring Propulsor comprises rotors wherein the blades of each rotor are asymmetric aerofoils and/or have blade washout (twist) and as such may be more efficient in producing forward thrust if less efficient in producing rearward thrust (compared with symmetrical blades). As illustrated by FIG. 31, the asymmetry and/or twist of the blades moves the plane of maximum lateral thrust forward of the centre of the Propulsor because the blades are more effective at producing thrust in one direction than the other (specifically, they are more effective at producing forward thrust than rearward thrust). The total possible lateral force from the centre of the Propulsor may be, however, somewhat reduced (this is evident from the smaller diameter of the maximum thrust envelope, compared with the case of symmetrical blades in FIG. 30, in the plane of the Propulsor's vertical and lateral axes).

The ODTV Propulsor can therefore produce a thrust-force envelope that extends in all radial directions from the centre of the Propulsor. FIG. 30 illustrates the shape of the thrust envelope of models/embodiments of the ODTV Propulsor which include blades with nil wash-out (blade twist) and symmetrical aerofoils. In contrast, FIG. 31 illustrates the shape of the thrust envelope of models/embodiments of the ODTV Propulsor which include blades with wash-out and/or asymmetrical aerofoils.

Thus, where a helicopter is equipped with an Omni-Directional Thrust-Vectoring Propulsor, the said Propulsor can provide yaw and pitch control to the pilot, as illustrated by way of example in FIGS. 3-10.

Combining linear translation and tilt/rotation, respectively, of the swashplate for each independent rotor assembly mixes the collective and cyclic control inputs. The typical swashplate arrangements are described above and shown in FIGS. 21, 22, 24, 25 and 28.

Therefore each independent rotor system can be individually adjusted so as to produce a thrust force that in combination with the other independent rotor(s) will produce a vector sum thrust force directed in any radial direction from the centre of the ODTV Propulsor (i.e. any angle of azimuth and elevation) desired by the operator or operating system. This is represented diagrammatically in the thrust envelope diagrams in FIGS. 30 and 31.

It can also be appreciated from FIGS. 30 and 31 that the magnitude of the vector sum thrust force is not equal in all radial directions, and more specifically, the thrust envelope is predominantly determined by the angle of tilt each rotor disk can achieve as well as by whether or not the blades of the respective rotors include wash-out and/or asymmetry of the aerofoil section.

The independent rotor disks (i.e. the disks defined by each of the respective independent rotor assemblies when they rotate) can be arranged to be parallel to one another so that each one produces a thrust force vector in the same direction. In this case the disks effectively act as one, and examples of this mode of operation are given in FIGS. 5-6, 9-10 and 16-17. Also in this case the vector sum thrust force of the Propulsor may be in a cone of 30 degrees or greater from the axis of the driveshaft in either the forward or aft direction, as illustrated in the thrust envelope diagrams in FIGS. 30 and 31. The forward and aft cones in FIGS. 30 and 31 are formed where the thrust vector of the number one rotor (R1) points in the same direction as the thrust vector of the number two rotor (R2).

Alternatively, as illustrated in FIGS. 3-4, 7-8, 14-15 and 19-20 the two disks of the ODTV Propulsor can be arranged at an angle to one another, but at equivalent angles to the axis of the driveshaft, and from there they can each be actuated so as to produce respective thrust force vectors of equal magnitude in substantially opposite directions (opposite directions in the sense that the thrust may be directed up and down, respectively, relative to the plane of the respective disks). In such configurations, the overall vector sum thrust force of the ODTV Propulsor system will be in a direction at right angles to the axis of the driveshaft but can still be at any chosen angle of azimuth about the driveshaft axis. This is represented diagrammatically in the thrust envelope diagrams in FIGS. 30 and 31 wherein the two centre cones of the thrust envelope are formed when the component of the thrust vector of the number one rotor (R1) that is parallel to the axis of the driveshaft points in the opposite sense to the same component of the thrust vector of the number two rotor (−R2).

In the case of embodiment of the Propulsor in a helicopter, the efficiency of blade aerofoil asymmetry and/or washout in forward thrust should be optimised along with (and balanced against) the need for efficiency in hover. If the Propulsor is installed in the helicopter with a small off-set angle in the horizontal plane, between the driveshaft and the centreline of the helicopter such that the angle between the centre of the Propulsor and the point of maximum lateral force is reduced will this partially compensate for this reduction in lateral force and assist with the optimisation of the forward and lateral thrust forces.

This ability, namely to achieve a sum total force at a right angle to the axis of the rotor driveshaft, cannot generally be achieved by a single rotor system.

The efficiency of the system in producing thrust forces perpendicular to the driveshaft is dependent on the angle by which the rotor disks can be tilted or rotated out of a plane perpendicular to the axis of the driveshaft and the efficiency of the universal joint connection between each rotor and the driveshaft.

Theoretically at least, in terms of direct rotor thrust forces, the greater this angle, the greater the efficiency should be. An angle of 30 degrees and greater may be particularly suitable because (as explained above) at 30 degrees the component of the force produced by each rotor that is perpendicular to the driveshaft is half the force of that rotor. The total thrust needed by the Propulsor to produce the anti-torque force for hover would therefore be approximately twice that of a conventional single anti-torque tail rotor of similar size.

The connection between the driveshaft and each rotor, for a two bladed semi-rigid rotor as shown in FIG. 11, may be a teetering joint. The connection between the drive shaft and each rotor, for a three or more bladed rotor may be a single ring gimbal universal joint or a multiple-ring gimbal universal joint. At such high angles of tilt as proposed here, the transfer of torque from the driveshaft to each rotor will also incur losses due to the torsion load from each rotor being out-of-plane from the plane perpendicular to the axis of the driveshaft. Teetering hubs and single ring gimbals, while being simple in construction, suffer the greatest losses and would only be suitable for ODTV Propulsor applications that require the lateral and/or vertical thrust components of small magnitude or for short durations such as for ships manoeuvring in port. For prolonged and frequent use more efficient universal joint connection between each rotor and the driveshaft is required. See below for a detailed discussion on universal joints.

Thus any "30 degree capable" ODTV Propulsors may not be (as) suitable for helicopters which are required to perform hover frequently and/or for long periods or to perform regular/significant heavy lifting. However for ODTV Propulsors incorporating high efficiency universal joints and large angles of tilt (greater than 30 degrees) the power disadvantage in hover is not overly large in comparison to current experimental compound helicopter designs produced/tested by major OEMs, and for many aircraft (and aircraft applications/operations) the significant benefit provided by the ability to achieve higher speed cruise (i.e. higher-speed forward flight) far outweighs the disadvantage of the somewhat higher power demand of the ODTV Propulsor in hover.

The two disks of the ODTV Propulsor can also be arranged at an angle to each other, but each at a different angle to a plane perpendicular to the driveshaft, and from there each can be actuated so as to produce respective thrust force vectors in either the same or opposite directions. (Here, the same or opposite directions means that both rotors may produce thrust which is directed "up" relative to the plane of the rotor disk, or both may produce thrust directed "down", or one may produce thrust "up" while the other produces thrust "down", etc). In such configurations the sum thrust force vector of the two independent rotor systems can be directed at any selected angle of azimuth and any angle of elevation relative to the axis of rotation of the driveshaft.

Universal Joints:

A single ring gimbal is a universal joint comprised of one ring between the driveshaft and the rotor where the ring incorporates two pairs of diametrically opposite pivots and where each pair of pivots is off-set 90 degrees from the other pair around the perimeter of the ring. One pair of pivots forms a pivotable connection to the driveshaft while the other pair of pivots forms a pivotable connection to the rotor. The arrangement allows the angular displacement of the rotor disk from a plane perpendicular to the driveshaft axis.

Figure 35:
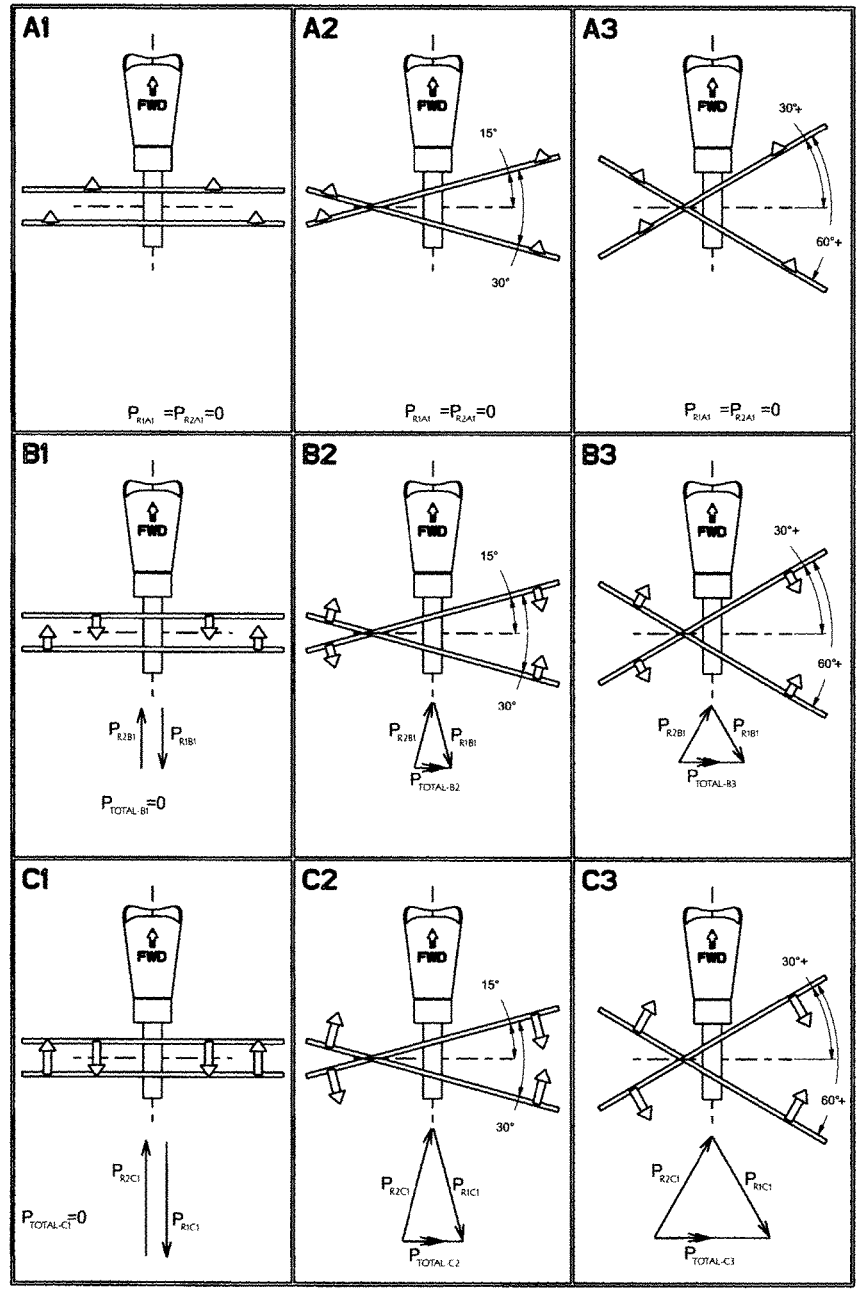
FIG. 35 contains a matrix showing the possible configurations a ODTV Propulsor may take when transitioning from one configuration to another in a symmetrical mode of operation. Symmetrical mode operations are configurations where the tilt of Rotor 1 and Rotor 2 are at the same angle to the axis of the driveshaft and the thrust of each rotor is in the opposite sense (relative to the plane of the disk) and of equal magnitude to the other. The matrix is presented with increasing angle of tilt from 1 through 3 (left to right as presented) and with increasing individual rotor thrust from A through C (top to bottom as presented). In configuration A1 the Propulsor produces no thrust at all. In configuration C3 the Propulsor produces maximum thrust perpendicular to the axis of the driveshaft. In symmetrical mode operations the sum total vector force of the Propulsor is either zero or if non-zero is perpendicular to the axis of the driveshaft—the vector summations are shown below each configuration. The matrix shown in FIG. 35 also shows the possible pathways from one configuration to another in the symmetrical mode. The configurations shown may be applied to a plane that is at any angle of azimuth about the axis of the driveshaft.

A single ring gimbal universal joint carries both torsional and axial loads. When a ODTV Propulsor incorporates a single ring gimbal joint this represents the third model of the Propulsor. FIG. 35 represents the third model however the figure shows the function of the single ring gimbal by a spherical joint with a torsion link.

A multiple-ring gimbal is a universal joint comprised of a core securely attached to a drive shaft surrounded by a plurality of concentric rings. Each ring, except for the outer ring, consists of two pairs of diametrically opposite pivots where each pair of pivots is off-set from the other pair by 90 degrees around the perimeter of the ring. For each ring, one pair of pivots forms a pivotable connection with the adjacent inner ring (or core) and the other pair forms a pivotable connection with the adjacent outer ring. The pivotable connections are made up of bearings allowing efficient rotation and torsional spring connectors allowing a proportional torque connection between the adjacent rings. The torsional spring connectors are comprised of elastomeric and spring elements that provide the spring and damping properties for the connection. The spring and damping properties (constants) may be selected as required to achieve even distribution of the angular displacement of the rotor through all of the rings of the gimbal. The spring and damping constants may also be sized so as to effectively resist the torsional and axial loads to and from the rotor when the rotor is displaced to significant angles of tilt. The spring and damping constants may also be sized to account for the dynamic issues including the effective mass carried by each torsion spring connector, the maximum angle of tilt, the size of torsional and axial loads being transferred through the gimbal and the rotational speed of the driveshaft, such that the possibility of resonance at operational speeds, angles of tilt and loads is avoided. The bearings may be sized to carry the axial and torsional loads applied to and from the rotor.

The multiple-ring gimbal provides three performance benefits—they are capable of large angles of displacement (tilt, greater than 30 degrees), efficient transfer of torsional loads between the driveshaft and rotor and are capable of carrying large axial and torsional forces.

Figure 26:
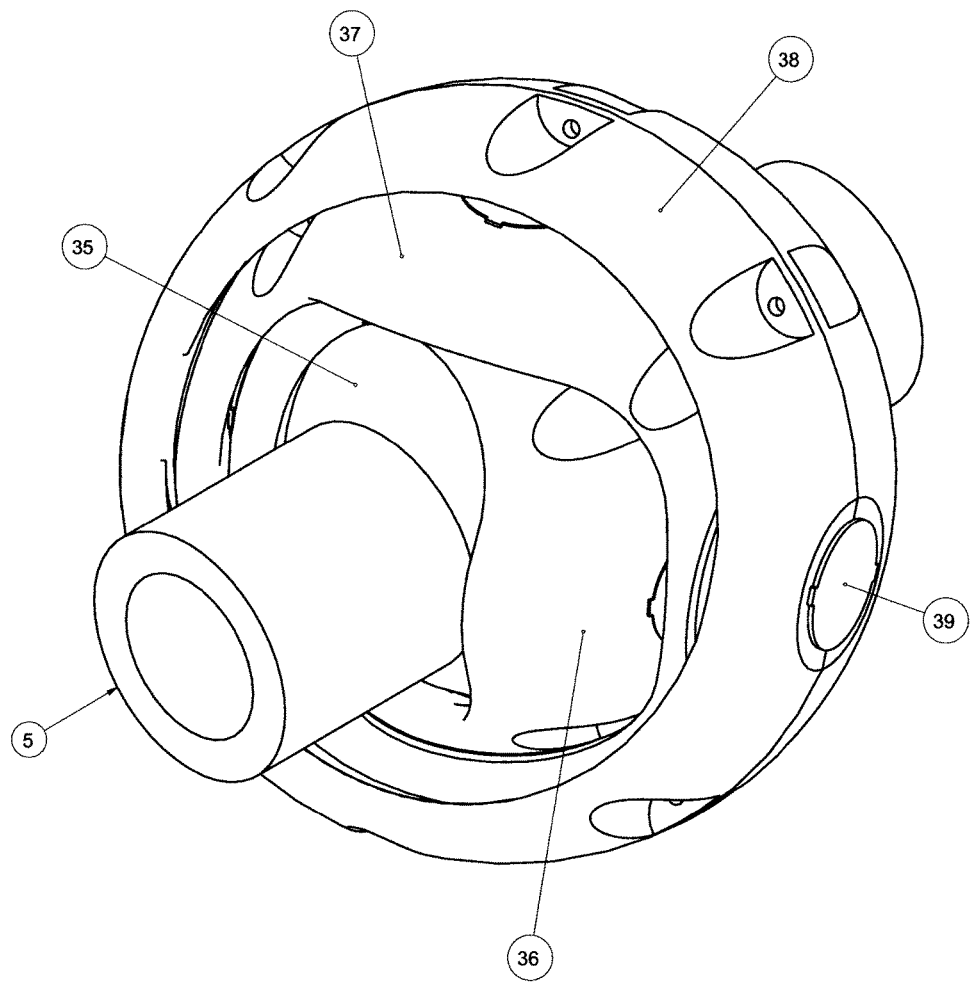
FIG. 26 contains an isometric view of a multiple-ring gimbal. In this embodiment the gimbal is a three-ring gimbal.
Figure 27:
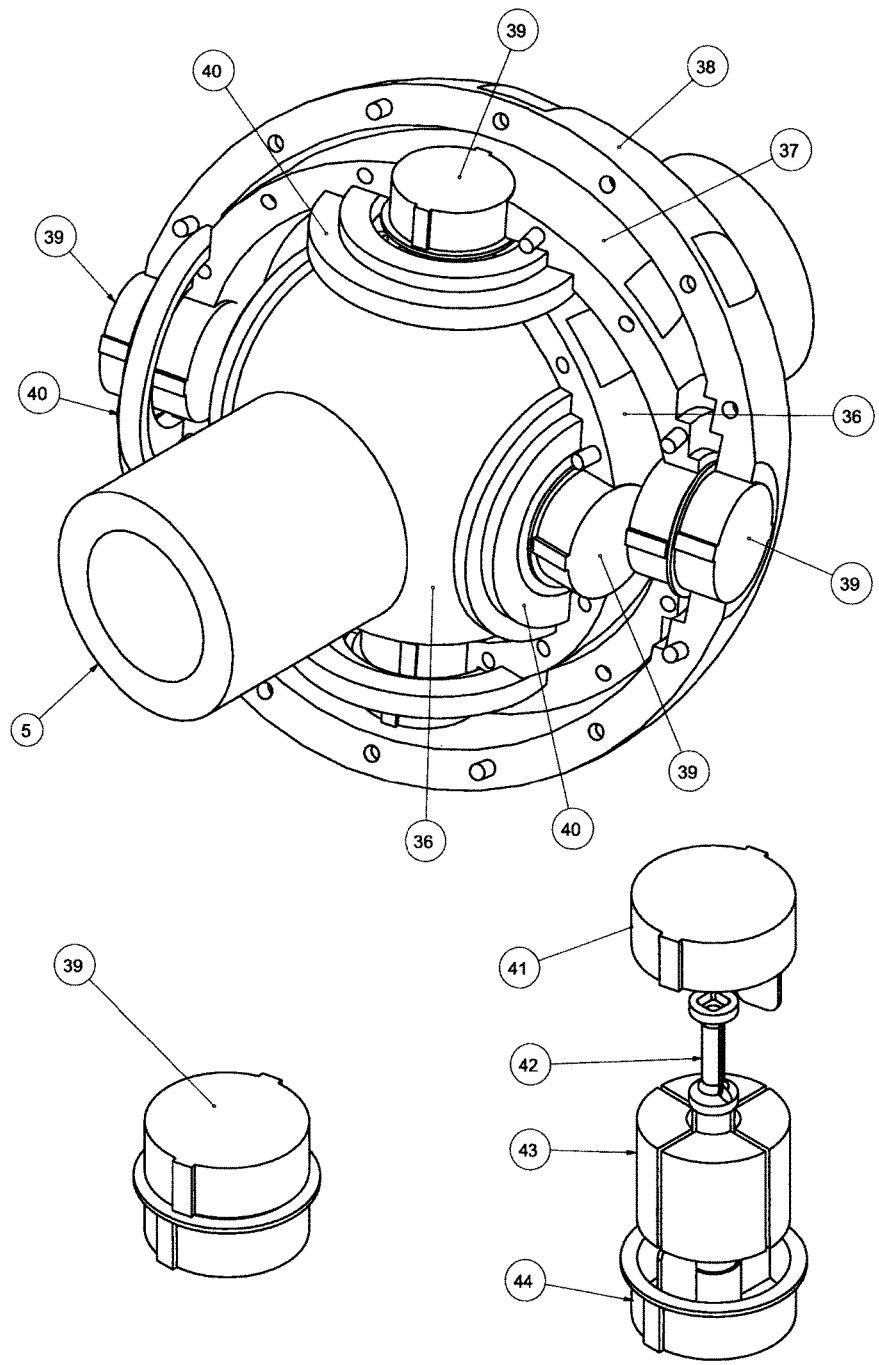
FIG. 27 contains schematic end, top and side views of a third model of Omni-Directional Thrust-Vectoring Propulsor made up of two rotors, each of which is a three-bladed semi-rigid rotor with swept blades of the kind shown in FIG. 23. The two rotors are separated in the axial direction. The two rotors are set at an angle of azimuth to each other that is less than 60 degrees. The angle offset between the two rotors, and the axial distance separating them, should preferably set so as to achieve an overall minimum amount of wake interference optimised for the most important modes of flight. The hub of each rotor tilts on a spherical bearing and is kept in line with the driveshaft via a torque link. The swashplates shown include three pitch change arms, one for each blade of a given rotor. Three push-pull rods are installed and extend up the inside of the driveshaft to connect the aft rotor to its respective swashplate. The fact that the ODTV Propulsor shown in this Figure features swept blades again demonstrates (by way of example) that models of Omni-Directional Thrust-Vectoring Propulsor may incorporate alternate or more efficient blade designs.
Figure 28:
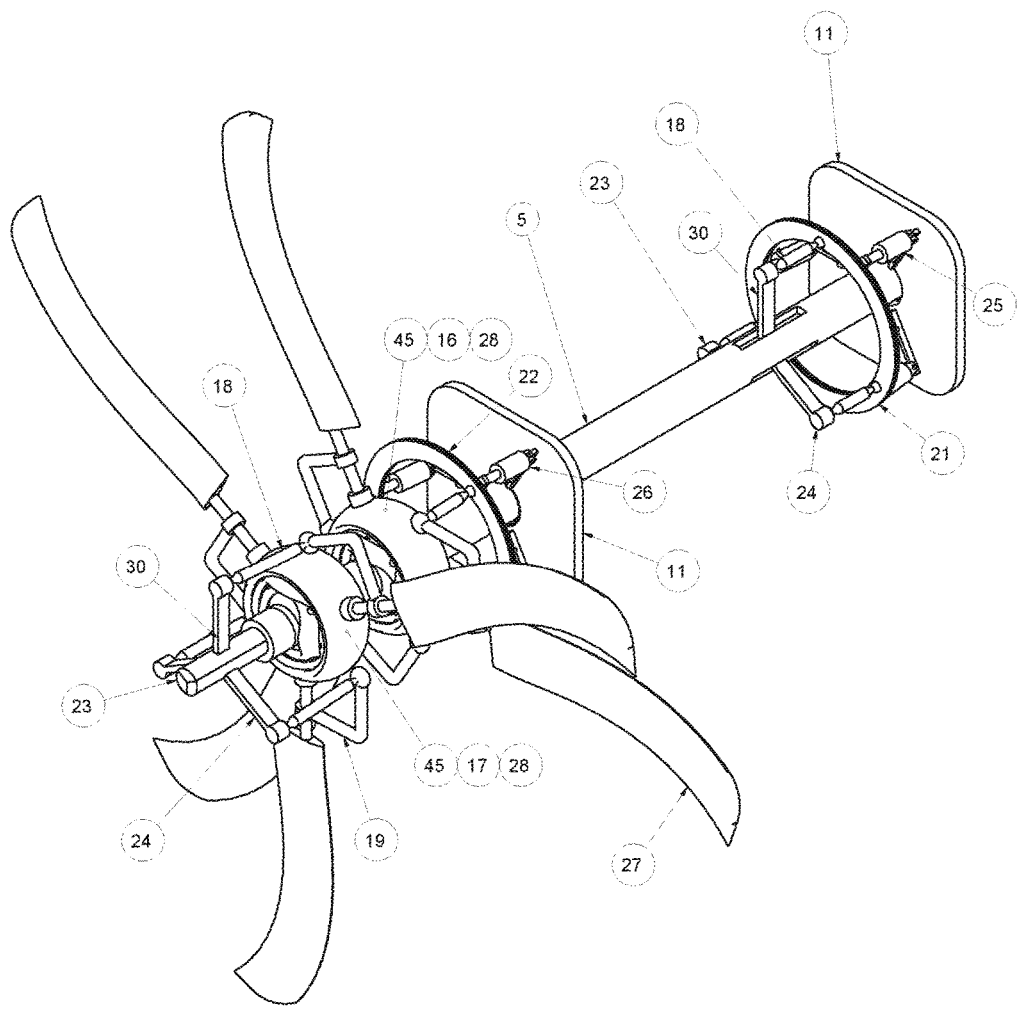
FIG. 28 contains a schematic isometric view of a forth model of the Propulsor similar to that of FIG. 25 however
Figure 29:
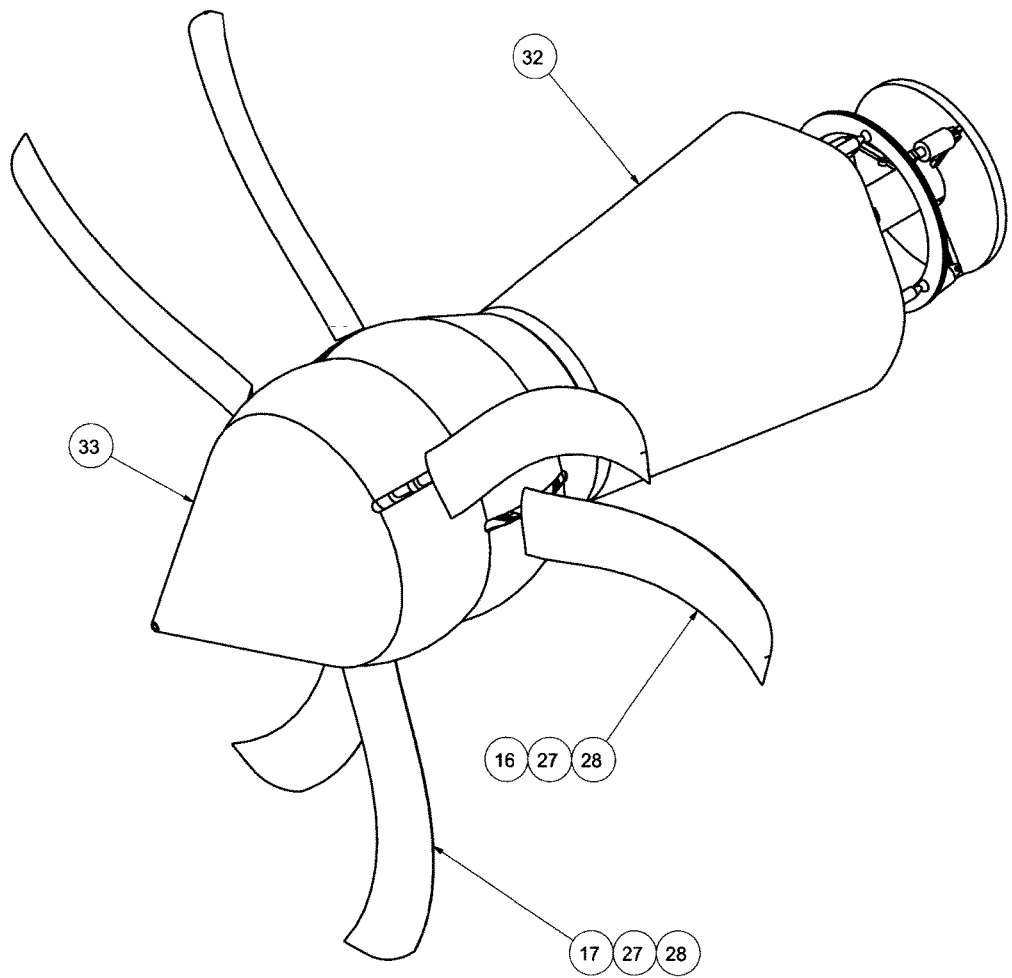
FIG. 29 contains schematic isometric view of the Omni-Directional Thrust-Vectoring Propulsor similar to FIGS. 25 and 28 except that FIG. 29 shows that the hub and control system of the ODTV Propulsor can be enclosed or encased in aerodynamic fairings. This may help to decrease drag and hence improve efficiency in the various configurations of operation.

One possible embodiment of an efficient universal joint suitable for application to a ODTV Propulsor is a three-ring gimbal (45) such as that shown in FIGS. 26 and 27. This three-ring gimbal incorporates damped torsional spring connections (39) between each ring of the gimbal assembly. Each torsional spring connection between adjacent rings (36), (37), (38) is sized in spring and damping constants and travel limits such that the angular displacement of the attached rotor disk may be approximately and evenly distributed through all of the rings of the gimbal assembly. Throughout the rotation of the shaft the middle and inner ring will oscillate while the outer ring will maintain the plane of tilt of the connected rotor thereby minimising the average angle of off-set between adjacent rings and creating a high efficiency universal joint. Each concentric ring is spherical in shape for compactness and minimisation of size. FIG. 28 shows the three-ring gimbal assembly embodied in the ODTV Propulsor.

Figure 33:
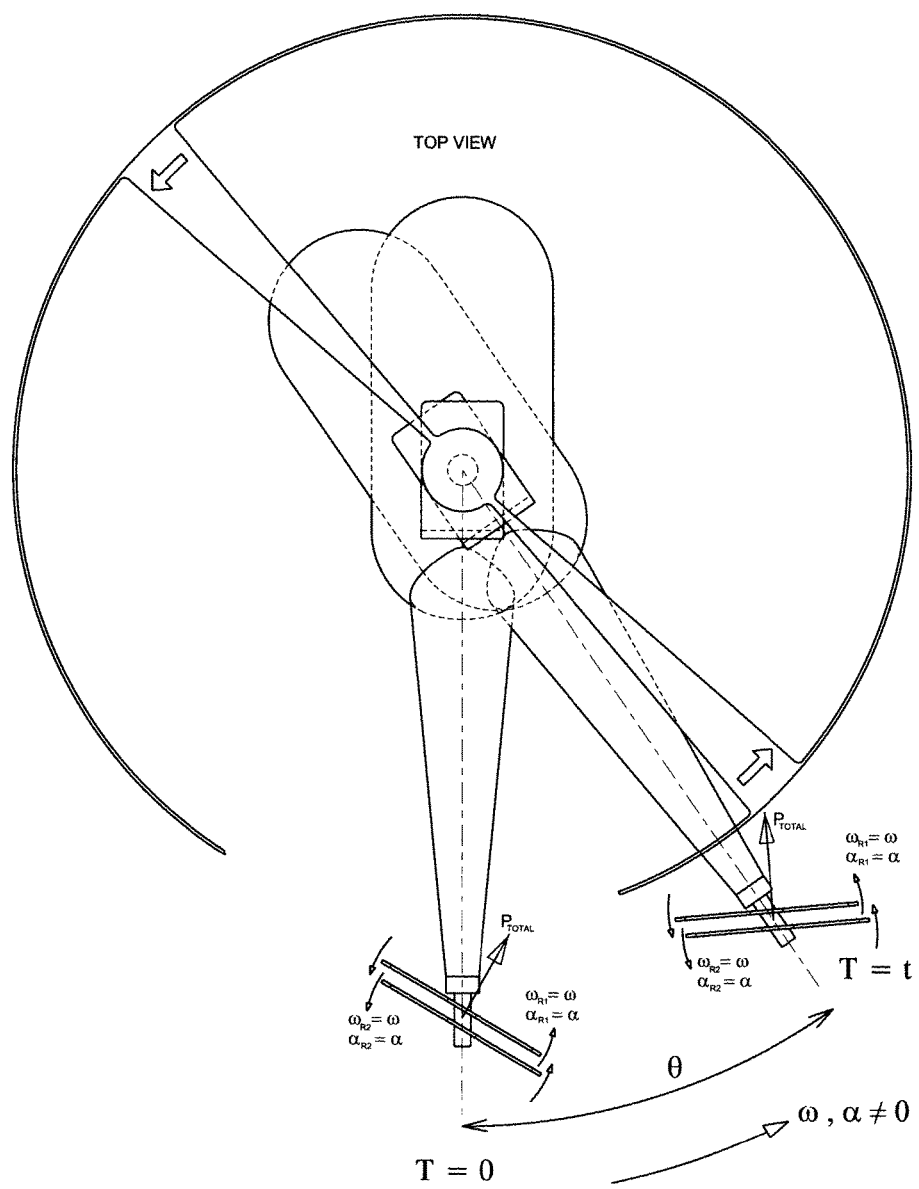
FIG. 33, like FIG. 32 contains a top view of a helicopter fitted with an ODTV Propulsor on the end of the tail boom.
Figure 34:
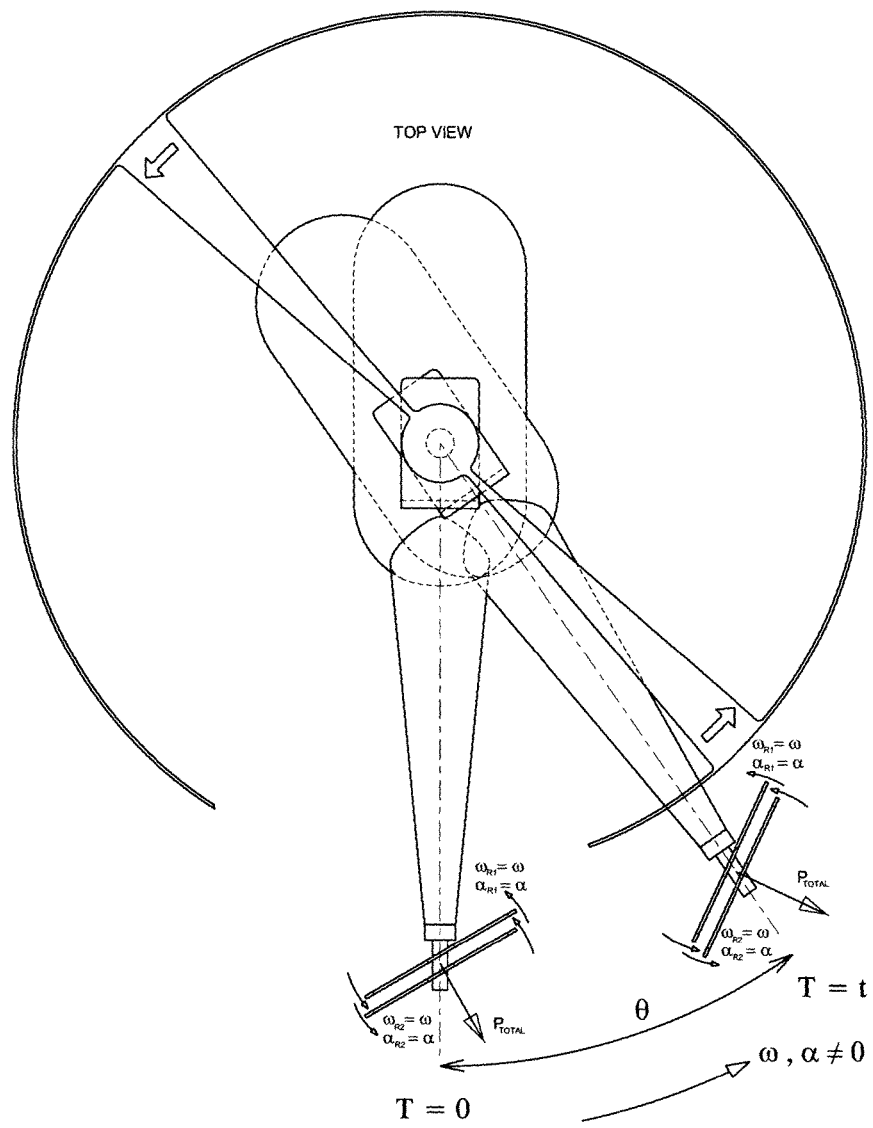
FIG. 34 like FIGS. 32 and 33 contains a top view of a helicopter fitted with an ODTV Propulsor on the end of the tail boom.

ODTV Propulsor Control System:

Due to the highly dynamic environment of helicopter flight the application of a ODTV Propulsor to a helicopter will only be viable and safe through the use of an user-operable active (digital) control system. Refer FIGS. 33, 34 and 35. Such a user-operable active control system may continuously measure and monitor the tilt of each rotor disk and the pitch of each blade of each rotor by continuously measuring and monitoring the extension of each actuator of each swashplate (via LVDT or similar electronic displacement measuring sensor). Such a user-operable active control system may also continuously measure and monitor the speed of rotation of the driveshaft as well as rates of rotation of the vehicle about the vehicle's yaw and pitch axis. Rates of rotation about the roll axis may also be included in the case of a helicopter due to torque produced by the OVDT Propulsor and the potential for it to roll the aircraft. Common electronic sensors such as tachometers and accelerometers may be used to measure driveshaft speeds and vehicle rates of rotation. The user-operable active control system may also measure and monitor the speed of the vehicle and attitude about pitch, yaw and roll axis via air data and inertial sensors. In the case of a helicopter the user-operable active control system may also measure and monitor the speed of the extension of the actuators of the swashplate of the main rotor.

Figure 32:
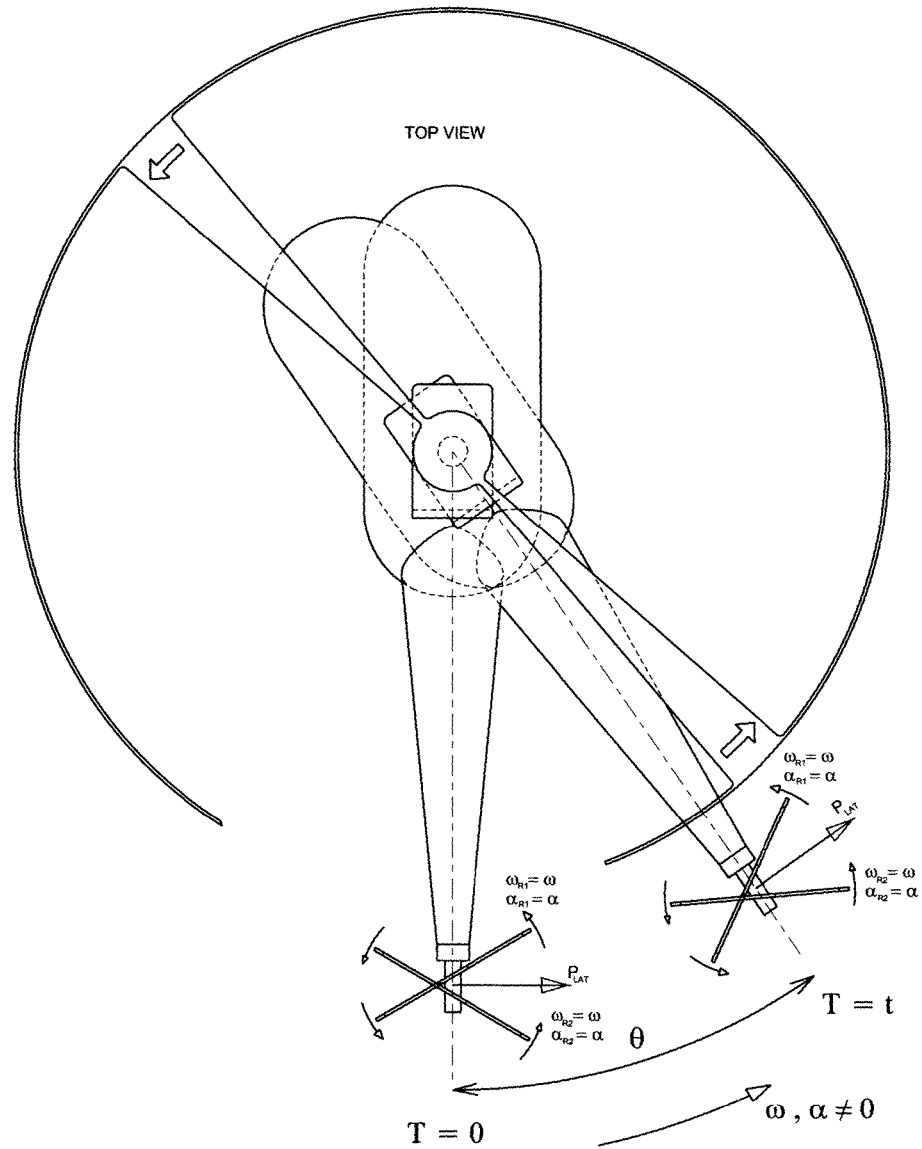
FIG. 32 contains a top view of a helicopter fitted with an ODTV Propulsor on the end of the tail boom.

The sensor data gathered above will be used by the user-operable active control system to ensure that the ODTV Propulsor produces the required sum thrust force magnitude in the required direction by ensuring that each rotor of the system is configured correctly to the required individual thrust force magnitude and direction and that those forces and directions are continuously maintained and/or changed in accordance with the intention of the control inputs from the operator. Refer FIGS. 32, 33 and 34. The user-operable active control system may measure and monitor all sensor data at a much faster rate than the operator and as such may adjust all and any configuration settings of the ODTV Propulsor to match operator inputs as well as to maintain the required the intended stability of the vehicle.

The sensor data gathered above will be used by the user-operable active control system to ensure that the rotors of the ODTV Propulsor do not reach their pivot or gimbal limits and thereby maintain the safety of the system.

The sensor data gathered above will be used by the user-operable active control system to ensure stability of the whole vehicle by linking roll forces resulting from torque from the ODTV Propulsor to those of the main rotor, using the main rotor to counter the torque from the Propulsor as required.

The sensor data gathered above will be used by the user-operable active control system to ensure stability of the whole helicopter by linking pitch forces from the ODTV Propulsor to those of the main rotor, slaving one to the other as required.

If the helicopter fitted with a ODTV Propulsor also features a supplemental wing (main plane) for generating lift at high speeds and balancing or further off-loading the main rotor, the sensor data gathered above will be used by the user-operable active control system to ensure stability of the whole aircraft by linking pitch and torque-roll forces from the ODTV Propulsor to pitch control of the main rotor and the roll control of the main plane (if any) as required.

Figure 36:
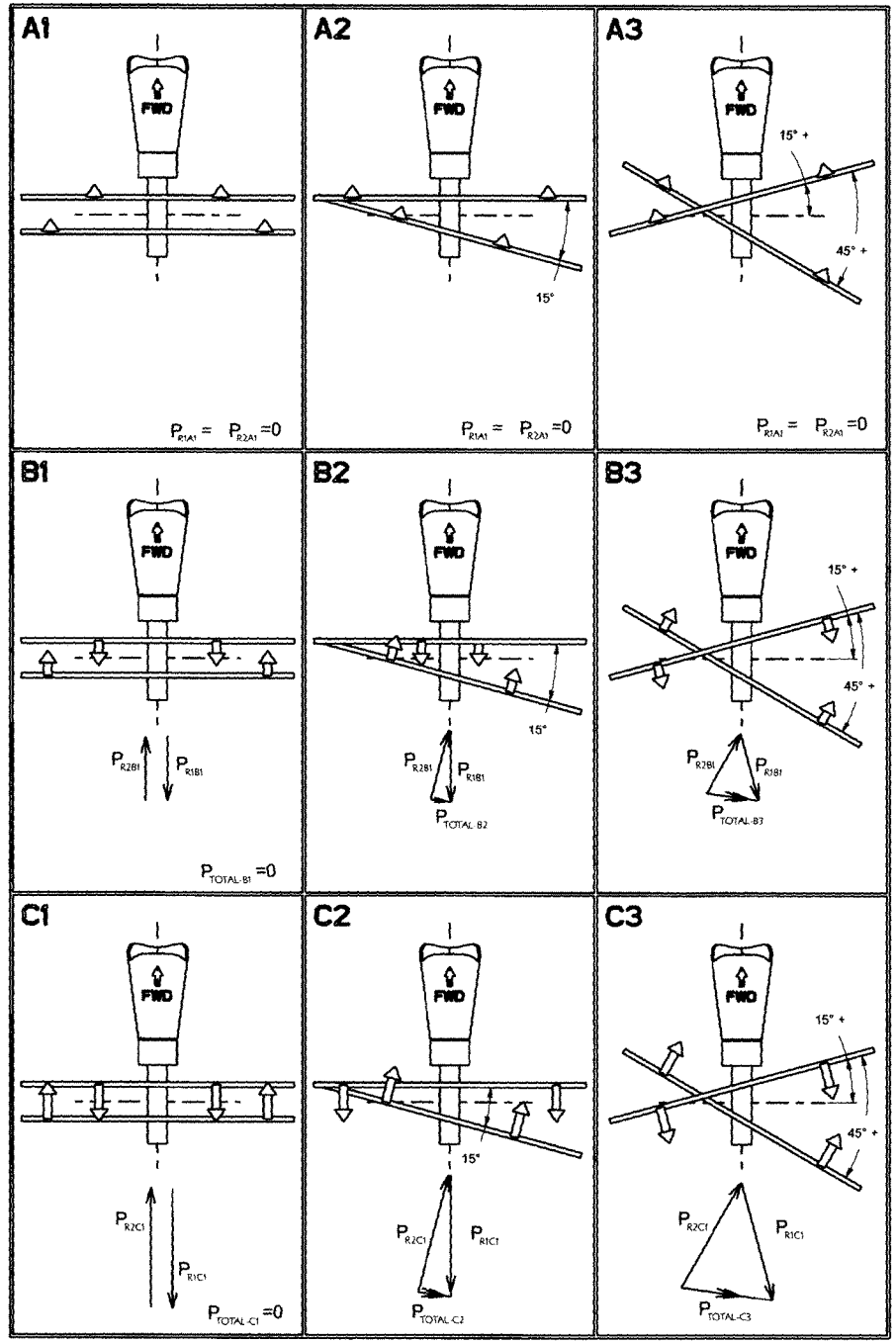
FIG. 36 contains a matrix showing the possible configurations a ODTV Propulsor may take when transitioning from one configuration to another in an asymmetric-tilt mode of operation. Asymmetric-tilt mode operations are configurations where the tilt of Rotor 1 and Rotor 2 are not at the same angle to the axis of the driveshaft but the thrust of each rotor is in the opposite sense (relative to the plane of the disk) and of equal magnitude to the other. The matrix is presented with increasing angle of tilt from 1 through 3 (left to right as presented) and with increasing individual rotor thrust from A through C (top to bottom as presented). In configuration A1 the Propulsor produces no thrust at all. In configuration C3 the Propulsor produces maximum thrust at a non-perpendicular angle to the axis of the driveshaft. In Asymmetric-tilt mode operations the sum total vector force of the Propulsor is either zero or if non-zero is not perpendicular to the axis of the driveshaft—the vector summations are shown below each configuration. The matrix shown in FIG. 36 also shows the possible pathways from one configuration to another in the asymmetric-tilt mode. The configurations shown may be applied to a plane that is at any angle of azimuth about the axis of the driveshaft.
Figure 37:
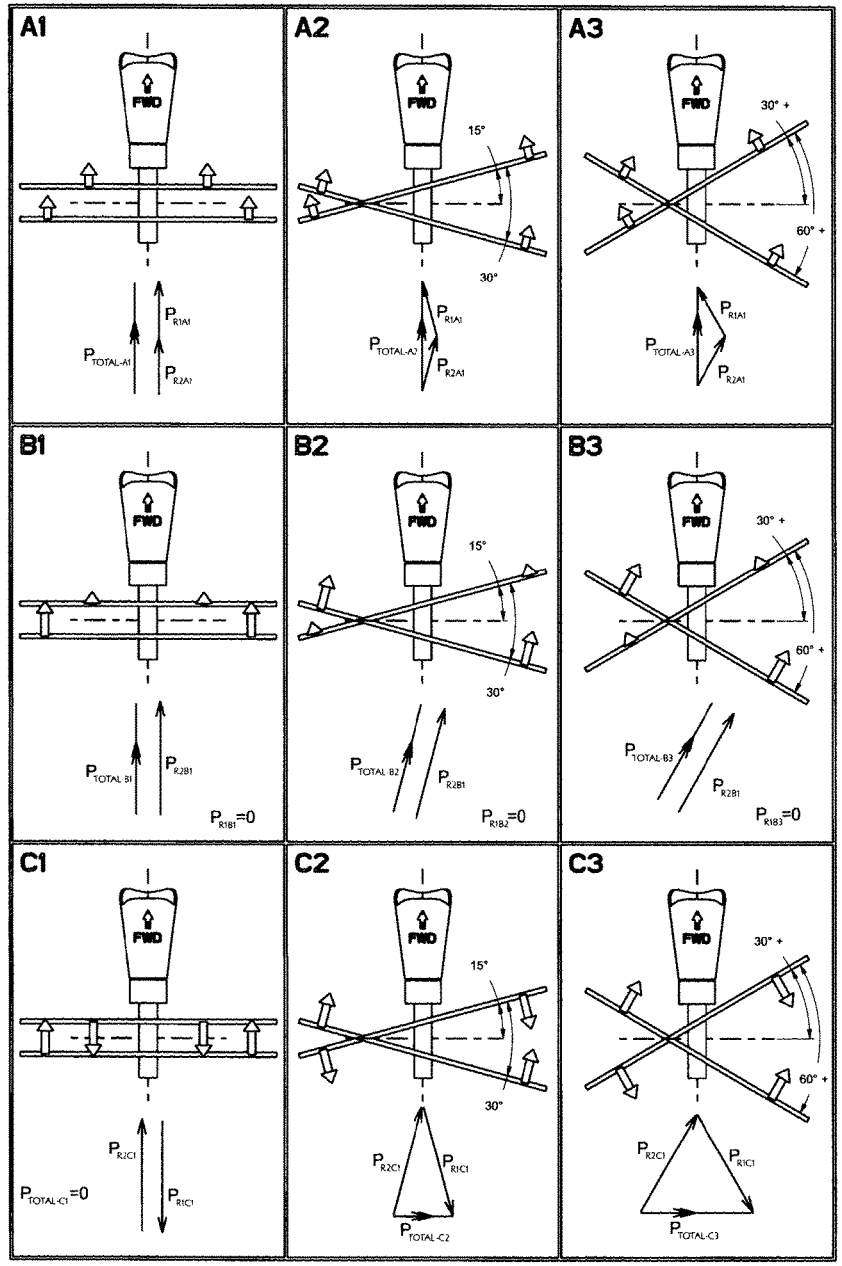
FIG. 37 contains a matrix showing the possible configurations a ODTV Propulsor may take when transitioning from one configuration to another in an asymmetric-thrust mode of operation. Asymmetric-thrust mode operations are configurations where the tilt of Rotor 1 and Rotor 2 are at the same angle to the axis of the driveshaft but the thrust of each rotor may be in either the same or opposite sense (relative to the plane of the disk) and of the same or different magnitude to the other. The matrix is presented with increasing angle of tilt from 1 through 3 (left to right as presented) and with increasing individual rotor thrust from A through C (top to bottom as presented). In configuration A1 the Propulsor produces forward thrust only. In configuration C3 the Propulsor produces maximum thrust perpendicular to the axis of the driveshaft. In Asymmetric-thrust mode operations the sum total vector force of the Propulsor is either zero or if non-zero may be at any angle between 0 and 90 degrees to the axis of the driveshaft—the vector summations are shown below each configuration. The matrix shown in FIG. 37 also shows the possible pathways from one configuration to another in the asymmetric-thrust mode. The configurations shown may be applied to a plane that is at any angle of azimuth about the axis of the driveshaft.

The user-operable active control system may independently select the rotor configurations to meet the required operator control inputs. The possible configurations and permutations of the two or more rotors of the ODTV Propulsor system are too numerous to cover here in detail except by way of a sample of examples—FIGS. 35, 36 and 37 show three different modes of operation of the Propulsor and the configurations of rotors that may be employed by those modes. These modes do not represent all possible modes. The configurations shown may be employed either continuously or momentarily during transition from one configuration to the other. Not all of the possible configurations are practical and usage will be determined by the user-operable active control system and the demand placed on it by the operator control commands. The user-operable active control system may also change and alternate between the various modes of operation to suit the demands of each situation.

By way of summary, various functionalities, capabilities and advantages of the particular models of Omni-Directional Thrust-Vectoring Propulsor disclosed herein are described below. (These functionalities, capabilities and advantages may also apply to embodiments of the invention other than those specifically described herein.)

The Omni-Directional Thrust-Vectoring Propulsor (and the various models/embodiments thereof) may allow an increase in cruise speed and maximum speed of helicopters to which it is applied. It may do so by providing a single propulsion system (which operates from a single fixed driveshaft) that can provide direct forward thrust, meaning that it is not necessary for the helicopter's main rotor to produce the forward thrust to propel the helicopter forward. This may, in turn, alleviate the need for the helicopter's main rotor to tilt, with the consequent advantages this provides (described above). The Omni-Directional Thrust-Vectoring Propulsor (and the various models/embodiments thereof) can also produce a direct anti-torque thrust force, as required to counteract torque from the main rotor.

Embodiments of the present invention may therefore provide a helicopter with the ability to fly at (perhaps significantly) higher speeds than is currently achievable by conventional single-main-rotor helicopters. Also incorporation of the above-described thrust and anti-torque functionalities into one Propulsor system ensures that there are no systems carried by the aircraft that have no function in some modes of flight, thus resulting in weight savings and efficiency improvements.

Embodiments of the present invention may also provide helicopters to which it is applied with improved pitch control. Further, the fact that embodiments of the present invention provide a single Propulsor system which is operated from a single fixed driveshaft may help to ensure that the system is mechanically simple, light weight and low cost. Given this simplicity, it may be possible for embodiments of the present invention to be retrofitted onto at least some existing airframes, and this may allow performance improvement benefits to be achieved, for example, from an existing helicopter or helicopter fleet.

Embodiments of the present invention may also be incorporated, for example, into the propeller or screw of a ship or boat, and may then provide the vessel with improved yaw control, from zero forward speed to maximum speed, and possibly allowing the vessel to dock with the minimum of assistance and turn or yaw at a greater rate when manoeuvring (including at speed).

Embodiments of the present invention may also be incorporated, for example, into the screw of a submarine or the thruster unit of airship, and may then (again) provide the vessel with improved yaw and pitch control, from zero forward speed to maximum speed, and possibly allowing the vessel to dock with the minimum of assistance and yaw and pitch at a greater rate when manoeuvring (including at speed).

Embodiments of the present invention may also be incorporated, for example, into a stationary fan unit, and may in this case provide the fan unit with the ability to vector the fluid flow in any radial direction from a fixed driveshaft simplifying the design of the fan or improving the functionality of an existing fixed fan system.

INDEX OF REFERENCE NUMBERS/SYMBOLS AND THE CORRESPONDING ITEMS/PARTS/ASSEMBLIES IN THE FIGURES

1. Teetering hub
2. Teetering bearing/axis
3. Blade pitch bearing
4. Simplified blade assembly.
5. Driveshaft
6. Driveshaft bearings
7. Blade tip path trace—defining disk swept by rotor
8. Modified teetering hub for co-location of rotors on driveshaft
9. Pivot bearing for Tension Ring
10. Tension Ring (and sliding bearing)
11. Airframe bulkhead
12. Outer swashplate
13. Inner swashplate
14. Outer swashplate actuator
15. Inner swashplate actuator
16. Forward independent rotor assembly
17. Aft independent rotor assembly
18. Pitch change push-pull rod, aft rotor
19. Blade pitch change lever arm
20. Pitch change push-pull rod, forward rotor
21. Aft rotor swashplate
22 Forward rotor swashplate
23. Blade 1, inner driveshaft push-pull rod for aft rotor
24. Blade 2, inner driveshaft push-pull rod for aft rotor
25. Aft rotor swashplate actuator
26. Forward rotor swashplate actuator
27. Swept blade
28. 3-bladed semi-rigid independent rotor
30. Blade 3, inner driveshaft push-pull rod for aft rotor
31. Torque link, connecting 3-bladed semi-rigid independent rotor to driveshaft
32. Tail boom of rotorcraft
33. Spinner, fairing for hub of ODTV Propulsor
34. 3-bladed semi-rigid independent rotor hub, tilting on a spherical bearing
35. Gimbal core, universal joint
36. Inner gimbal ring, universal joint
37. Middle gimbal ring, universal joint
38. Outer gimbal ring, universal joint
39. Torsional spring connector assembly
40. Bush-bearing, ring
41. Inner cap (with blade(s)) of torsional spring connector
42. Spring element of torsional spring connector
43. Elastomeric element (rubber-spring-damper) of torsional spring connector
44. Outer cap (with blade(s)) of torsional spring connector
45. Multiple-ring gimbal assembly Lat. Lateral or sideways direction relative to the ODTV Propulsor driveshaft or the vehicle.
Long. Longitudinal or forward/aft direction relative to the ODTV Propulsor driveshaft or the vehicle.
Up Vertical up direction relative to the ODTV Propulsor driveshaft or the vehicle.
R1 Rotor number one thrust force vector
R2 Rotor number two thrust force vector
−R2 Rotor number two thrust force vector where the component of the vector parallel to the axis of the driveshaft is pointing in the aft direction.
$P_{TOT}$ Total thrust force vector of the ODTV Propulsor $P_{LAT}$ Lateral component of the total thrust force vector of the ODTV Propulsor $P_{LONG}$ Longitudinal component of the total thrust force vector of the ODTV Propulsor $P_{HORIZ\ TOT}$ Sum of the components of the ODTV Propulsor's thrust vector which lie in the horizontal plane $P_{VERT\ TOT}$ Sum of the components of the ODTV Propulsor's thrust vector which lie in the vertical plane $P_{UP}$ Vertical up component of the total thrust force vector of the ODTV Propulsor Possible aspects, embodiments and/or functions of the invention may also be defined or described by the following statements:

(i). An Omni-Directional Thrust-Vectoring Propulsor, which may be a propeller or external rotor system, that can produce a thrust force of a selected magnitude in any selected radial direction from the centre of the hub or effective centre of the Propulsor.

(ii). The Omni-Directional Thrust-Vectoring Propulsor system that can produce the function (i) can do so from a single driveshaft that is fixed in its position in a vehicle or machine.

(iii). The Omni-Directional Thrust-Vectoring Propulsor system when producing the thrust force of (i) is fully controllable by the operator of the system whereby the magnitude of the vector sum thrust force and the direction of the said force is selected by the operator via the control system of the Propulsor.

(iv). The thrust force of (i) can be directed at any angle of azimuth about the axis of the driveshaft of the Propulsor system. Also the thrust force of (i) can be directed in any angle of elevation about the centre of the Propulsor from 0 degrees to 90 degrees from the axis of the driveshaft of the Propulsor in either the direction forward or aft of the Propulsor relative to the driveshaft. Also the thrust force of (i) can be directed at any selected combined angle of azimuth and elevation about the axis of the driveshaft and the centre of the Propulsor respectively.

(v). The Omni-Directional Thrust-Vectoring Propulsor that can produce the function of (i) is a system that contains at least two separate rotors. Each of the rotors is a separate rotor system that functions independently of the other rotor(s).

(vi). The Omni-Directional Thrust-Vectoring Propulsor that can produce the function of (i) contains at least two independent rotor systems that are arranged to be at least co-axial and co-rotating with each other.

(vii). The Omni-Directional Thrust-Vectoring Propulsor that can produce the function of (i) contains at least two independent rotor systems wherein each independent rotor system is made up of a semi-rigid rotor the swept disk of which is capable of tilting out of a plane that is perpendicular to the axis of the drive shaft of the Propulsor such that the angle of tilt is sufficient to efficiently produce the horizontal (lateral and/or longitudinal) and/or vertical force components desired.

(viii). The Omni-Directional Thrust-Vectoring Propulsor that can produce the function of (i) contains at least two independent rotor systems in which each blade of each independent rotor system is independently variable in pitch angle.

(ix). The Omni-Directional Thrust-Vectoring Propulsor that can produce the function of (i) contains at least two independent rotor systems, wherein each blade of each independent rotor system is independently variable in pitch such that the pitch of each pair of blades of each independent rotor system is variable both collectively (the pitch of a blade is increased or decreased at the same time and the same sense with the other blade(s) of the same rotor) and cyclically (the pitch of all blades of the rotor are increased or decreased by the same proportion and in the same sense as they pass through the same angle of azimuth about the driveshaft of the rotor).

(x). The Omni-Directional Thrust-Vectoring Propulsor that can produce the function of (i) contains the same quantity of swash plates as independent rotor systems, wherein each blade of each rotor system is independently variable in pitch and wherein the pitch of each blade of each rotor system is variable both collectively and cyclically and wherein the pitch of each blade of each rotor system is actuated by a pitch change mechanism actuated by, and connected to, an independent swash plate.

(xi). The Omni-Directional Thrust-Vectoring Propulsor that can produce the function of (i) contains the same quantity of swash plates as independent rotor systems, whereby each swash plate being moved along the axis of the driveshaft of the Propulsor produces collective pitch change in the blades of the connected rotor and each swash plate being rotated or tilted out of a plane perpendicular to the axis of the driveshaft produces cyclic pitch changes in the blades of the connected rotor.

(xii). The Omni-Directional Thrust-Vectoring Propulsor that can produce the function of (i) contains at least two independent rotor systems and the same number of independent swash plates of (x) whereby each independent rotor system is actuated by its own independent swash plate.

(xiii). The Omni-Directional Thrust-Vectoring Propulsor that can produce the function of (i) contains two independent swash plates of (x) whereby each independent swash plate is actuated by electrical, mechanical or hydraulic actuators or actuators which operate using a combination of electrical, mechanical and/or hydraulic systems, which are in turn either controlled by electrical, mechanical and/or hydraulic connections to the control system forming part of an active digital control system (fly-by-wire control system for an aircraft).

(xiv). The Omni-Directional Thrust-Vectoring Propulsor that can produce the function of (i) is operated by a control system that at least accounts for: 1.) The translational position, angle of tilt and radial of tilt about the axis of the drive shaft of each swash plate; 2.) the angle each independent rotor disk is rotated or tilted out of a plane that is perpendicular to the axis of the driveshaft of the Propulsor; 3.) the speed of the vehicle (speed or helicopter); 4.) the speed of travel of the vehicle relative to the fluid and yaw or pitch attitudes; 5.) the rates of rotation of the vehicle; and 6.) speed of rotation of the driveshaft.

(xv). The Omni-Directional Thrust-Vectoring Propulsor that can produce the function of (i) is operated by a control system that at accounts for the rates of rotation of the vehicle as per (xiv) whereby the rates of rotation accounted for are based on the rotations about the two axes of the vehicle's primary axes that are perpendicular to the axis of the driveshaft of the Propulsor or, if the axis of the driveshaft is not parallel with one of the primary axes of the vehicle, the control system must account for those components of the vehicle's primary axes which are perpendicular to the driveshaft of the Propulsor.

(xvi). The Omni-Directional Thrust-Vectoring Propulsor that can produce the function of (i) is operated by a control system that accounts for the angle each independent rotor is rotated or tilted out of a plane perpendicular to the axis of the driveshaft of the Propulsor as per (xiv) whereby the control system must also function in a manner that prevents either or both independent rotors from reaching the out of plane limits of the rotors.

(xvii). The Omni-Directional Thrust-Vectoring Propulsor that can produce the function of (i) is operated by a control system that must account for the thrust and/or drag forces produced by the ODTV Propulsor at all speeds.

(xviii). The Omni-Directional Thrust-Vectoring Propulsor that can produce the function of (i) and is operated by the control system of (xiv) and (xvii) must respond to pilot control inputs in such a way so as to not require the reversal of pilot control inputs to maintain control at the point where the thrust of the ODTV Propulsor changes to drag (or thrust in the diametrically opposite direction) and vice-versa, due to the effects of changes in vehicle airspeed and rotational speeds of the blades of the ODTV Propulsor.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

The invention claimed is:

1. A propulsion system for an aircraft comprising:
   a drive member which is operable to rotate about a primary rotational axis that is fixed in its position in the aircraft and generally aligned with the longitudinal axis of the aircraft; and
   a plurality of independently pivoting independent rotors characterized as semi-rigid rotors comprising three or more rotor blades extending generally radially from the centre of the rotor with each blade able to be pivoted independently about an axis extending radially from the centre of each rotor wherein the rotors are mounted at axially spaced locations along the drive member; and
   a plurality of multiple-ring gimbal universal joints connecting the independent rotors to the drive member; and
   a plurality of independent swashplates whereby each swashplate independently controls one connected rotor by push-pull rods connected to the pitch change arms of each rotor blade of that rotor, and where the swashplates affect both collective and cyclic control of the rotor blades,
   wherein, when the drive member is rotated about its primary axis, the propulsion system is controllably configurable such that each independent rotor sub-system produces an individual thrust force of a selected magnitude and in a selected direction such that the selected magnitude and direction of said individual thrust force are independent of the selected magnitudes and directions of the individual thrust forces of the other independent rotor sub-systems of the propulsion system.

2. The propulsion system as claimed in claim 1, wherein the propulsion system is operable to produce a total force of controllably variable magnitude which can be controllably oriented at any angle of elevation relative to the centre of the propulsion system and at any angle of azimuth about the primary rotational axis of the drive member.

3. The propulsion system as claimed in claim 1, wherein the propulsion system is operable such that the total force produced by the rotor system can be controllably oriented at any angle of elevation from 0° to 90° from the primary rotational axis of the drive member, with any component of the total force that is parallel to the primary rotational axis of the drive member being in either the drive member's forward or aft direction, and such that the total force produced by the rotor system can be controllably oriented at any angle of azimuth about the primary rotational axis of the drive member.

4. The propulsion system as claimed in claim 1, wherein the aircraft in which the propulsion system is embodied is a helicopter with at least one main rotor for producing lift the propulsion system is operable to produce at least one of the following forces: a longitudinal, a lateral or a vertical thrust force component to control the helicopter in hover and other modes of flight.

5. The propulsion system as claimed in claim 1, wherein rotation of each rotor creates or defines a swept disk wherein each rotor disk can tilt at least 30 degrees in any direction relative to a plane perpendicular to the primary rotational axis of the drive member and be controllably oriented at any angle of azimuth about the primary rotational axis of the drive member.

6. The propulsion system as claimed in claim 1, wherein the multiple-ring gimbal universal joint is comprised of:
   a drive member and a gimbal core; and
   a plurality of concentric rings, where each ring, except for the outer ring, features two pairs of diametrically opposite pivots where each pair of pivots is off-set from the other pair by 90 degrees around the perimeter of the ring, and where for each ring, one pair of pivots forms a pivotable connection with the adjacent inner ring or core and the other pair forms a pivotable connection with the adjacent outer ring or rotor hub; and
   pivotable connections between each ring at the pivot points, where each pivotable connection is made up of a bearing allowing rotation and a torsional spring connector allowing a graduated and proportional torque connection between the adjacent rings and where the torque of the torsion spring connection increases with angular displacement in either direction from the neutral point for that pair of rings and also where the torsional spring connectors possess both spring-elastic and damping properties,
   wherein when the drive member rotates and the rotor to which the gimbal is attached is tilted out of a plane perpendicular to the primary axis of rotation of the drive member the angular displacement of the rotor tilt is approximately evenly distributed through the rings of the gimbal.

7. The propulsion system as claimed in claim 1, wherein the multiple-ring gimbal universal joint possesses spring and damping constants sized to account for the dynamic aspects of the installation including effective mass carried by each torsional spring connector, maximum angle of tilt of the rotor, magnitude of torsional and axial loads being transferred through the gimbal and the rotational speed of the drive member such that the possibility of resonance at operational speeds, angles of tilt and loads is avoided.

8. The propulsion system as claimed in claim 1, wherein the aircraft in which the propulsion system is embodied is a helicopter with at least one main rotor for producing lift, the propulsion system is operable to produce either individually or in any combination the following forces;

- a vertical force either up or down, to maintain or affect a change in the attitude of the helicopter, either by itself or in concert with a pitching moment generated by a main rotor;
- a lateral force either left or right, to maintain or affect a change in the heading of the helicopter including the lateral force to balance the yawing moment produced by the torque from a main rotor;
- a longitudinal force either forward or aft, to accelerate or decelerate the helicopter or to maintain the speed of the helicopter.

9. The propulsion system as claimed in claim 1, wherein the aircraft in which the propulsion system is embodied is an airship the propulsion system is operable to produce either individually or in any combination the following forces;

- a vertical force up or down, to maintain or affect a change in the attitude of the airship;
- a lateral force left or right, to maintain or affect a change in the heading of the airship;
- a longitudinal force forward or aft, to accelerate or decelerate the airship or to maintain the speed of the airship.

10. The propulsion system as claimed in claim 1, wherein the vector sum thrust force of the individual thrust forces of the plurality of the independent rotor sub-systems of the propulsion system is of a controlled and selected magnitude and is also directed without limitation in any selected radial direction from the centre of the propulsion system.

* * * * *